( 12 ) United States Patent
Inamasu et al.

(10) Patent No.: US 10,190,637 B2
(45) Date of Patent: Jan. 29, 2019

(54) SEALED BEARING ASSEMBLY

(71) Applicant: NTN CORPORATION, Osaka (JP)

(72) Inventors: Kazunori Inamasu, Shizuoka (JP);
Yugo Yoshimura, Shizuoka (JP);
Takahiro Wakuda, Shizuoka (JP);
Katsuaki Sasaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/556,165

(22) PCT Filed: Mar. 8, 2016

(86) PCT No.: PCT/JP2016/057176
§ 371 (c)(1),
(2) Date: Sep. 6, 2017

(87) PCT Pub. No.: WO2016/143786
PCT Pub. Date: Sep. 15, 2016

(65) Prior Publication Data
US 2018/0045247 A1 Feb. 15, 2018

(30) Foreign Application Priority Data

Mar. 9, 2015 (JP) .................. 2015-045800
Mar. 1, 2016 (JP) .................. 2016-038993
Mar. 8, 2016 (JP) .................. 2016-044050

(51) Int. Cl.
F16C 33/78 (2006.01)
F16C 19/06 (2006.01)
(Continued)

(52) U.S. Cl.
CPC .......... *F16C 33/7823* (2013.01); *F16C 19/06* (2013.01); *F16C 33/726* (2013.01);
(Continued)

(58) Field of Classification Search
CPC ........ F16C 19/06; F16C 19/04; F16C 33/763; F16C 33/768; F16C 33/7816;
(Continued)

(56) References Cited

U.S. PATENT DOCUMENTS 3,586,342 A    6/1971 Staab
3,639,016 A *  2/1972 Bourgeois ........... F16C 33/6618
                                                277/349

(Continued)

FOREIGN PATENT DOCUMENTS

CA         970407        7/1975
DE   202011100738 U1 *  9/2011  .............. F16C 33/78
(Continued)

OTHER PUBLICATIONS

English translation of International Preliminary Report on Patentability dated Sep. 12, 2017 in International (PCT) Application No. PCT/JP2016/057176.

(Continued)

*Primary Examiner* — Marcus Charles
(74) *Attorney, Agent, or Firm* — Wenderoth, Lind & Ponack, L.L.P.

(57) ABSTRACT

A sealed bearing assembly includes seal members each including a seal lip with multiple protrusions, and being arranged such that oil passages are defined between the seal lip and a seal sliding surface which is configured to slide circumferentially relative to the protrusions such that the oil passages communicate with a bearing internal space and an exterior of the bearing, and prevent passage of foreign objects having particle diameters larger than a predetermined value therethrough. The seal lip and the seal sliding surface are arranged such that, when the bearing rotates, lubricating oil in the oil passages is pulled into spaces between the seal lip and the seal sliding surface such that a (Continued)

fluid lubricating condition is created between the seal lip and the seal sliding surface, due to a wedge effect.

17 Claims, 22 Drawing Sheets

(51) Int. Cl.
  *F16J 15/34* (2006.01)
  *F16C 33/72* (2006.01)
(52) U.S. Cl.
  CPC ...... *F16C 33/7826* (2013.01); *F16C 33/7833* (2013.01); *F16C 33/7856* (2013.01); *F16C 2223/08* (2013.01); *F16C 2300/02* (2013.01); *F16C 2326/06* (2013.01); *F16J 15/3408* (2013.01); *F16J 15/3428* (2013.01)
(58) Field of Classification Search
  CPC .............. F16C 33/7823; F16C 33/7886; F16C 2326/06; F16C 15/3428; F16C 43/045; F16C 2223/08; F16J 15/3404; F16J 15/3408; F16J 15/3428; B61F 12/22
  USPC ........ 384/477, 479, 484, 486; 277/351, 349, 277/394, 399, 407, 549, 648
  See application file for complete search history.

(56) References Cited

U.S. PATENT DOCUMENTS

| | | | |
|---|---|---|---|
| 3,640,542 A | 2/1972 | Mowat et al. | |
| 5,024,449 A * | 6/1991 | Otto | B61F 15/22 277/353 |
| 5,044,642 A | 9/1991 | Vogt et al. | |
| 5,211,406 A * | 5/1993 | Katzensteiner | F16J 15/3256 277/351 |
| 5,269,536 A * | 12/1993 | Matsushima | F16J 15/3256 277/349 |
| 5,332,235 A * | 7/1994 | Fone | F16J 15/36 277/380 |
| RE35,309 E * | 8/1996 | Matsushima | F16J 15/3264 277/351 |
| 5,553,870 A | 9/1996 | Czekansky et al. | |
| 5,711,534 A | 1/1998 | Bengoa et al. | |
| 5,890,812 A * | 4/1999 | Marcello | F16C 33/7813 384/148 |
| 5,921,555 A | 7/1999 | Johnston | |
| 6,692,007 B2 * | 2/2004 | Oldenburg | F16J 15/324 277/353 |
| 8,267,406 B2 * | 9/2012 | Svejkovsky | F16J 15/38 277/390 |
| 8,955,849 B2 * | 2/2015 | Sedlar | F16J 15/3232 277/563 |
| 9,150,226 B2 * | 10/2015 | Rode | F16J 15/0887 |
| 9,291,272 B2 * | 3/2016 | Lattime | F16J 15/3256 |
| 9,914,326 B2 * | 3/2018 | White | B60B 27/0073 |
| 2011/0133412 A1 | 6/2011 | Mause et al. | |
| 2012/0051680 A1 * | 3/2012 | Ishikawa | F16C 33/3887 384/462 |
| 2012/0161402 A1 * | 6/2012 | Picatto | F16C 33/7856 277/551 |

FOREIGN PATENT DOCUMENTS

| | | | | |
|---|---|---|---|---|
| DK | 44 43 422 | | 6/1996 | |
| FR | 2636691 | | 3/1990 | |
| GB | 2 112 879 | | 7/1983 | |
| JP | 44-19641 | | 8/1969 | |
| JP | 61-235589 | | 10/1986 | |
| JP | 08254213 A | * | 10/1996 | |
| JP | 10196664 A | * | 7/1998 | .......... F16C 33/7823 |
| JP | 2004270775 A | * | 9/2004 | .......... F16C 33/7856 |
| JP | 2006266496 A | * | 10/2006 | .......... F16C 33/7856 |
| JP | 2007-107588 | | 4/2007 | |
| JP | 2008-25692 | | 2/2008 | |
| JP | 2008-240949 | | 10/2008 | |
| JP | 2011-122723 | | 6/2011 | |
| SE | 225 796 | | 3/1969 | |

OTHER PUBLICATIONS

International Search Report dated May 31, 2016 in International (PCT) Application No. PCt/JP2016/057176.
Extended European Search Report dated Mar. 21, 2018 in European Patent Application No. 16761754.7.

* cited by examiner

SEALED BEARING ASSEMBLY

CROSS REFERENCE TO RELATED APPLICATIONS

This application is the National Stage of International Application No. PCT/JP2016/057176, filed Mar. 8, 2016 and is based on and claims the benefit of priority from Japanese Patent Application No. 2015-045800, filed on Mar. 9, 2015, Japanese Patent Application No. 2016-038993, filed on Mar. 1, 2016, and Japanese Patent Application No. 2016-044050, filed on Mar. 8, 2016, the contents of all of which are incorporated herein by reference.

TECHNICAL FIELD

The present invention relates to a sealed bearing assembly comprising a rolling bearing and seal members.

BACKGROUND ART

Foreign objects such as wear dust produced from gears exist in transmissions mounted on vehicles such as automobiles and construction machinery. Rolling bearings used in such transmissions therefore include seal members which prevent entry of foreign objects into the bearing interior space, thereby preventing premature breakage of the rolling bearings.

Such seal members usually include a seal lip made from e.g., rubber. Bearing parts that rotate in the circumferential direction relative to the seal members, such as bearing races or slingers, are formed with seal sliding surfaces with which the seal lips of the seal members are in sliding contact. In this arrangement, since the seal lips are in sliding contact with the respective seal sliding surfaces over the entire circumference thereof, the drag resistance of the seal lips (seal torque) is high, which results in increased bearing torque. Also, the friction due to such slide contact increases the temperature of the rolling bearing. The higher the temperature of the bearing, the more strongly the seal lips tend be pressed against the seal sliding surfaces due to an increased pressure difference between the interior space of the bearing and the exterior of the bearing, thus further increasing the friction therebetween.

In order to reduce the seal torque of such a seal member, which is in contact with the seal sliding surface, JP Patent Publication 2007-107588 A proposes to subject the seal sliding surface to shot peening to form minute undulations thereon such that the seal sliding surface has a maximum roughness Ry of 2.5 micrometers or less, thereby promoting the formation of oil film between the seal lip and the seal sliding surfaces by lubricating oil trapped in the recesses of the minute undulations.

Object of the Invention

By subjecting the seal sliding surface to shot peening as disclosed in JP Patent Publication 2007-107588 A, the seal torque decreases because the area of the portion of the seal sliding surface that is brought into sliding contact with the seal lip decreases. However, since it is difficult to significantly reduce this area, the seal torque cannot be significantly reduced, either.

Immediately after the bearing begins to rotate, oil film forms easily since the temperature of lubricating oil is relatively low, and its viscosity is relatively high. However, as the bearing is operated continuously, the oil temperature rises and its viscosity decreases, thus making the formation of oil film increasingly difficult. Also, the higher the operating speed of the bearing, the higher the peripheral speed of the seal sliding surface relative to the seal lip, so that a larger amount of heat is generated due to friction between the seal lip and the seal sliding surface, resulting in an increased oil temperature and faster wear of the seal lip. Thus, the maximum speed, i.e., maximum rotational speed, of the sealed bearing disclosed in JP Patent Publication 2007-107588 A is limited due to its lubricating conditions. That is, while there is a strong demand for sealed bearings which are capable of supporting rotating parts in the drive train of an electric vehicle (EV) and capable of being operated at high speed, sealed bearings whose seal sliding surfaces are subjected to shot peening for reduced torque cannot meet this demand.

While a bearing with non-contact seal members is free of seal torque, it is difficult to precisely manage the sizes of the gaps between the seal members and bearing parts to prevent entry of foreign objects larger in diameter than a predetermined threshold.

SUMMARY OF THE INVENTION

An object of the present invention is to reduce torque and increase the maximum speed, of a sealed bearing assembly, while preventing entry of foreign objects larger in diameter than predetermined threshold.

Means for Achieving the Object

In order to achieve this object, the present invention provides a sealed bearing assembly comprising a bearing defining a bearing interior space;

a seal member separating the bearing interior space from an exterior of the bearing, and including a seal lip;

a seal sliding surface configured to slide relative to the seal lip in a circumferential direction; and a protrusion formed on one circumferential portion of the seal lip, and defining oil passages extending between the seal sliding surface and the seal lip, and communicating with the bearing interior space and the exterior of the bearing;

wherein the protrusion is shaped and arranged in such a manner that fluid lubricating condition can be created between the seal lip and the seal sliding surface.

Advantages of the Invention

With this arrangement, the protrusion defines oil passages between the seal sliding surface and the seal lip, and as the bearing rotates, lubricating oil in the oil passages is pulled into the space between the seal sliding surface and the seal lip due to the wedge effect, so that oil film can be easily formed therebetween. As a result, the bearing can be operated with the seal lip and the seal sliding surface completely separated from, and out of contact with, each other (i.e., with fluid lubricating condition created therebetween), so that the seal torque can be reduced to practically zero. This practically prevents the wear of the seal lip, and reduces heat buildup due to sliding movement between the seal lip and the seal sliding surface. This increases the maximum allowable peripheral speed of the seal sliding surface relative to the seal lip, which in turn makes it possible to operate the sealed bearing assembly at a high speed that was not attainable with conventional such sealed bearings. It is also possible to prevent sticking of the seal lip.

It is possible to determine the maximum diameter of foreign objects that can pass through the oil passages based on the protruding height of the protrusion. Thus, it is possible to freely determine the minimum particle diameter of foreign objects that cannot pass through the oil passages into the bearing.

Therefore, according to the present invention, it is possible to reduce the torque and increase the speed, of a sealed bearing assembly, while preventing entry of foreign objects having particle diameters larger than a predetermined value.

BEST MODE FOR EMBODYING THE INVENTION

Figure 1:
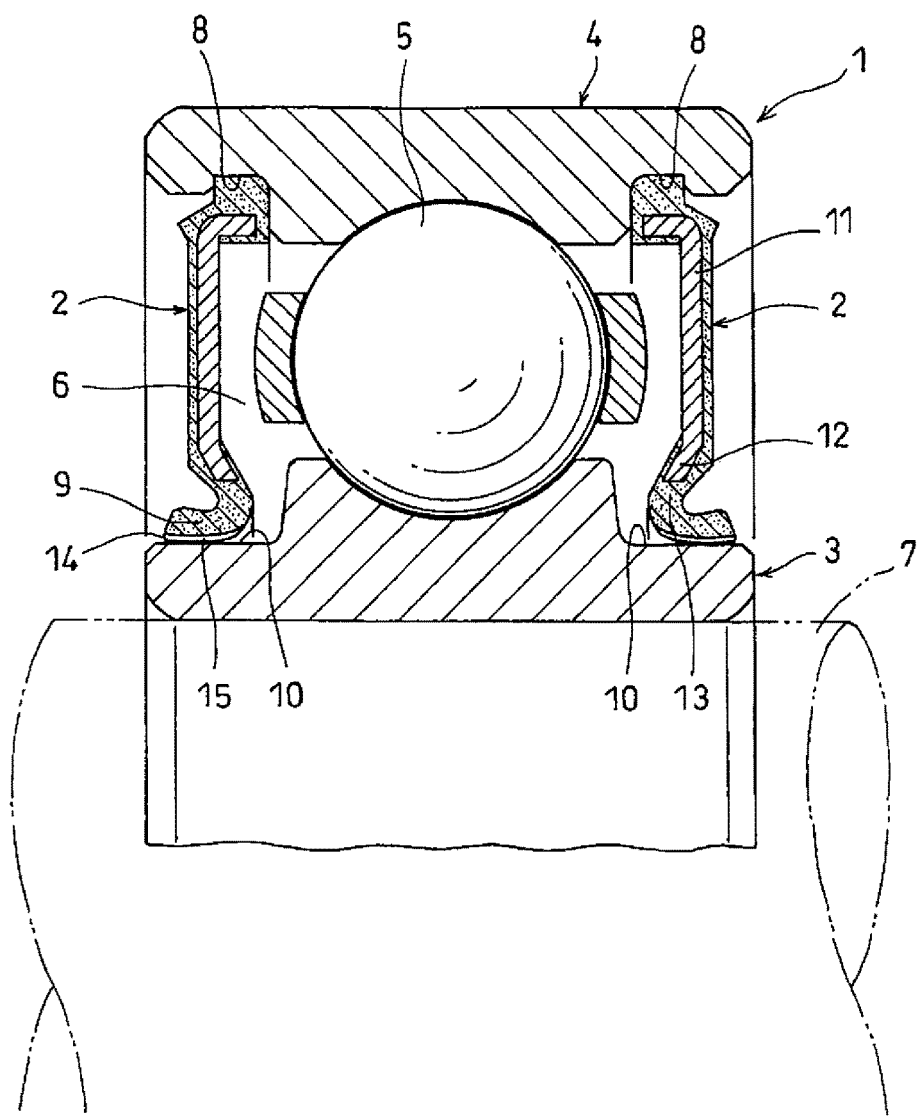
FIG. 1 is a sectional view of a sealed bearing assembly according to a first specific embodiment of the present invention.

Preferable general embodiments are now described.

In a first general embodiment, the protrusion is one of a plurality of protrusions arranged at equal intervals over the entire circumference. According to the first general embodiment, oil film can be easily and uniformly formed over the entire circumference of the seal sliding surface.

In a second general embodiment, the protrusion or each of the plurality of protrusions is formed with at least one circumferentially extending groove. According to the second general embodiment, since lubricating oil in the oil passages flows into the groove of the protrusion, oil film can be further readily formed between the seal lip and the seal sliding surface. The groove also serves to reduce the sliding contact surface area, which significantly influences the seal torque.

In the third specific embodiment, wedge-shaped gaps are defined between the protrusion or each of the plurality of protrusions and the seal sliding surface such that each of the wedge-shaped gaps is larger on the side of the corresponding one of the oil passages than on the side of the protrusion. According to the third specific embodiment, when the bearing rotates, lubricating oil in the oil passages can be more easily pulled toward the protrusion due to the wedge effect of the wedge-shaped gaps between the protrusion and the seal sliding surface, so that oil film can be more easily formed between the protrusion and the seal sliding surface. Also, the wedge-shaped gaps are effective to reduce the sliding contact surface area, which significantly influences the seal torque.

In the fourth general embodiment, the protrusion or each of the plurality of protrusions extends in the direction perpendicular to the circumferential direction, and has a rounded shape such that the distance between the protrusion and the seal sliding surface decreases from the respective ends of the protrusion toward the center of the protrusion, with respect to the circumferential width of the protrusion. According to the fourth embodiment, since the protrusion extends in the perpendicular to the circumferential direction, i.e., the direction in the seal sliding surface slides, and has such a rounded shape as to reduce the sliding contact surface area, the protrusion and the seal sliding surface are brought into sliding contact with each other along a linear area. Also, since the protrusion has the above-described rounded shape, the wedge angle of each wedge-shaped gap gradually decreases from its wide end toward its narrow end. Such wedge-shaped gaps can effectively produce the wedge effect, thereby increasing the oil pressure at the linear area. This makes it easier to create fluid lubricating condition between the protrusion and the seal sliding surface. Also, even if the protrusion is rubbed against the seal sliding surface when mounting the seal member, since the protrusion has the above-described rounded shape, it will never be bent in the circumferential direction, so that the performance of reducing the seal torque will never deteriorate when mounting the seal member.

SPECIFIC EMBODIMENTS

Figure 2A:
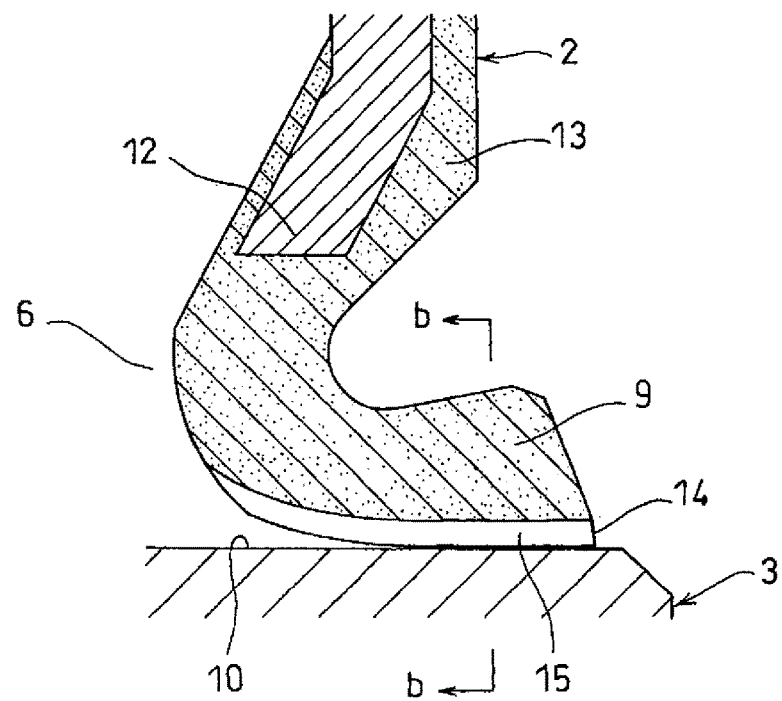
FIG. 2A is an enlarged view of and around a seal lip of FIG. 1.
Figure 2B:
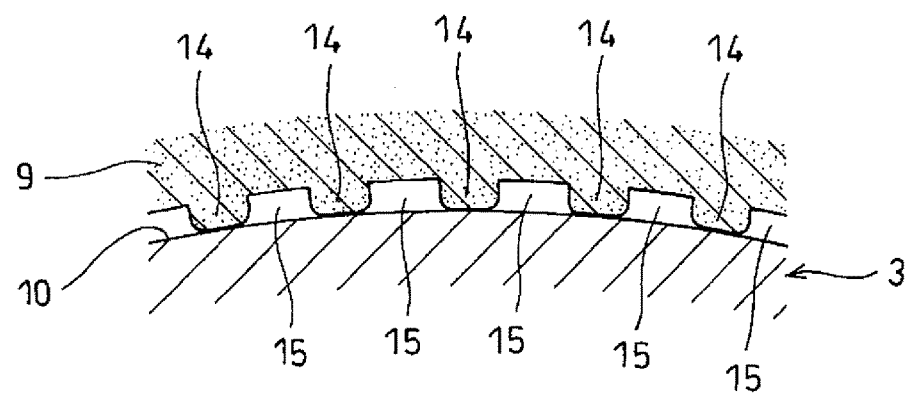
FIG. 2B is a sectional view taken along line b-b of FIG. 2A
Figure 3:
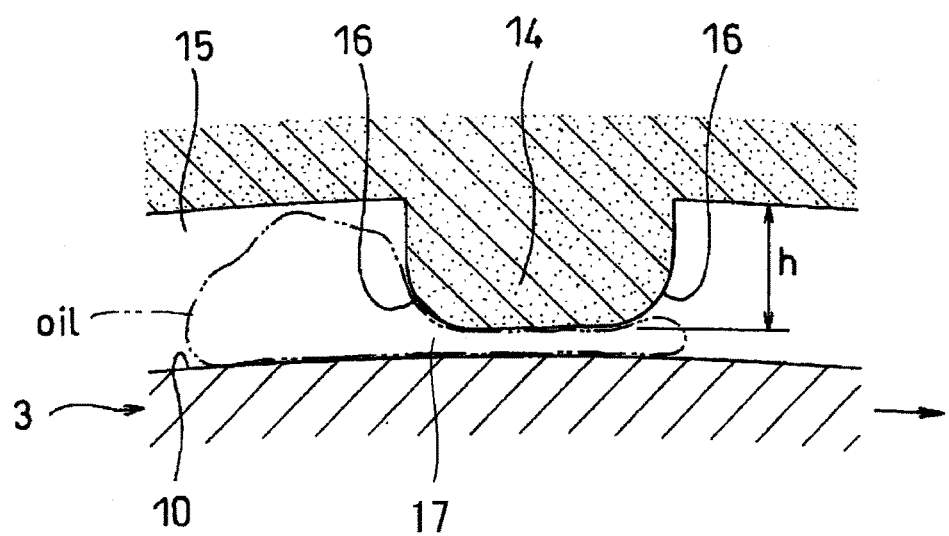
FIG. 3 is a partial sectional view of the first specific embodiment, showing how a protrusion works.

FIGS. 1-3 show a first specific embodiment of the present invention. As shown in FIG. 1, the first specific embodiment is a sealed bearing assembly including a rolling bearing 1, and seal members 2 at the respective ends of the rolling bearing 1.

The rolling bearing 1 includes an inner race 3, an outer race 4, and a plurality of rolling elements 5. The inner race 3 and the outer race 4 define an annular bearing interior space 6. The rolling elements 5 are received in the bearing interior space 6, while being disposed between the inner race 3 and the outer race 4, and are configured to revolve around the center axis of the rolling bearing 1. The rolling elements 5 are balls. Lubricating oil in the form of grease or oil from an oil bath is supplied into the bearing interior space 6.

The inner race 3 is mounted on a rotary shaft 7 to rotate together with the rotary shaft 7. The outer race 4 is mounted on a member to which a load from the rotary shaft 7 is to be applied, such as a housing or a gear. The rolling bearing 1 supports the rotary shaft 7.

The rotary shaft 7 may be, for example, a rotary portion of a transmission, a differential, a constant-velocity joint, a propeller shaft, or a turbocharger, of a vehicle, or a rotary portion of a machine tool, a wind turbine generator, or a wheel bearing assembly.

The seal members 2 separate the bearing interior space 6 from the exterior of the bearing 1. In the exterior of the bearing 1, which is isolated from the bearing interior space by the seal members 2, powdery foreign objects exist, which are different in kind according to the environment in which the rolling bearing 1 is mounted, and which include wear dust of gears and/or clutches, minutely crushed stones, etc. Such powdery foreign objects could reach the area around the rolling bearing 1 by the flow of air or lubricating oil. The seal members 2 prevent the entry of such foreign objects into the bearing interior space 6.

The direction of the center axis of the rolling bearing 1 is hereinafter referred to as the "axial direction"; a direction perpendicular to the center axis of the rolling bearing 1 is hereinafter referred to as a "radial direction"; and the direction around the center axis of the rolling bearing 1 is hereinafter referred to as the "circumferential direction". The rolling bearing 1 and the rotary shaft 7 are arranged such that their center axes coincide with each other.

Seal grooves 8 are formed in the inner periphery of the outer race 4 at the respective end portions thereof. Each seal member 2 includes an outer peripheral edge press-fitted in the corresponding seal groove 8 so that the seal member 2 is attached to the outer race 4, and a seal lip 9 protruding in the shape of a tongue at the inner peripheral portion of the seal member 2.

The inner race 3 has an outer periphery formed with seal sliding surfaces 10 configured to slide relative to the respective seal lips 9 in the circumferential direction. The seal sliding surfaces 10 are cylindrical surfaces, i.e., surfaces extending the entire circumference.

Each seal member 2 comprises a metal core 11 in the form of a metal plate, and a vulcanized rubber section 13 adhered to at least a radially inner portion 12 of the metal core 11. The seal lip 9 is a tongue-shaped portion of the vulcanized rubber section 13. The core metal 11 is an annular member, i.e., a member that extends the entire circumference, formed by pressing. The vulcanized rubber section 13 is formed by vulcanizing a rubber material. The seal member 2 is formed, for example, by placing the meal core 11 in a mold, and forming the vulcanized rubber section 13 by vulcanization such that the metal core 11 and the vulcanized rubber section 13 form an integral body. The vulcanized rubber section 13 may be adhered to the entire metal core 11, or adhered only to the radially inner portion 12 of the metal core 11.

As shown in FIGS. 2A and 2B, the seal lip 9 is a radial seal lip, i.e., a lip in contact with the seal sliding surface 10 in the radial direction with radial interference between the seal lip 9 and the seal sliding surface 10. Due to this radial interference, that is, due to the seal lip 9 being radially pressed against the seal sliding surface 10, the seal lip 9, which is made from rubber, is elastically deformed outwardly, so that the seal lip 9 is tightly wrapped around the seal sliding surface 10. Any mounting errors, or any manufacturing errors, of the seal member 2 are therefore absorbed when the seal lip 9 is elastically bent.

In order to minimize the force with which the seal lip 9 is wrapped around the seal sliding surface 10, thereby minimizing the seal torque, the base portion of the seal lip 9 at which the seal lip 9 is bent (i.e., deformed) outwardly has preferably as small a wall thickness as possible.

The seal lip 9 has protrusions 14 protruding in the directions perpendicular to the seal sliding surface 10, i.e., in the normal directions perpendicular to the tangential directions of the seal sliding surface 10. Since the seal sliding surface 10 is a cylindrical surface having a center on the center axis of the bearing, the above-mentioned normal directions are the radial directions. The protrusions 14 extend, from the distal edge of the seal lip 9, over the entire length of the surface portion of the seal lip 9 that can radially face the seal sliding surface 10. When the seal member 2 is mounted in position, since the protrusions 14 are not completely collapsed by the force with which the seal lip 9 is wrapped around the seal sliding surface 10, oil passages 15 are defined on both circumferential sides of each protrusion 14 to extend between, and communicate with, the interior space 6 of the bearing and the exterior of the bearing.

The protrusions 14 are arranged at equal intervals, i.e., in a dispersed manner, over the entire circumference of the seal lip 9. The oil passages 15 are therefore also arranged at equal intervals over the entire circumference of the seal lip 10. The interference between the seal lip 9 and the seal sliding surface 10 is determined by the interferences between the protrusions 14 and the seal sliding surface 10. This is because the seal lip 9 can be brought into sliding contact with the seal sliding surface 10 only at the protrusions 14.

The oil passages 15 are grooves extending substantially along the seal sliding surface 10, and communicating with the interior space 6 of the bearing and the exterior of the bearing. If the bearing is lubricated with grease, base oil oozing from the grease in the bearing interior space 6 flows through the oil passages 15 to the exterior of the bearing. If the bearing is lubricated with oil from an oil bath or splashed oil, lubricating oil outside the bearing enters the bearing interior space 6 through the oil passages 15, while lubricating oil in the bearing interior space 6 flows through the oil passages 15 to the exterior of the bearing.

Each protrusion 14 is chamfered at the respective circumferential sides thereof. That is, wedge-shaped gaps 17 are defined between each protrusion 14 and the seal sliding surface 10 such that the width of each wedge-shaped gap 17 gradually increases in the circumferential direction toward the corresponding oil passage 15. The chamfers shown are rounded chamfers, but plane chamfers may be used instead. Plane chamfers also define wedge-shaped gaps 17 between the protrusions 14 and the seal sliding surface 10.

Referring to FIG. 3, when the inner race 3 rotates in the circumferential direction (for example, in the direction of the arrow in FIG. 3), lubricating oil (shown by two-dot chain line) in each oil passage 15 is pulled into the space between the seal sliding surface 10 and the corresponding one of the protrusions 14 of the seal lip 9, due to the rotation of the seal sliding surface 10, so that oil film is formed easily therebetween, thereby reducing the friction coefficient ($\mu$) between the seal lip 9 and the seal sliding surface 10, which in turn reduces the seal torque. The oil passages 15 allow oil to flow more easily between the bearing interior space 6 and the exterior of the bearing. This prevents an excessive rise in temperature of the rolling bearing 1, which in turn prevents sticking of the seal lip. Thus, the sealed bearing assembly of the first specific embodiment operates with a low torque.

Due to the wedge effect of the wedge-shaped gaps 17 between the protrusions 14 and the seal sliding surface 10, lubricating oil in the oil passages 15 can be easily pulled into the spaces between the protrusions 14 and the seal sliding surface 10, so that oil film can be formed easily therebetween. Also, with this arrangement, since the chamfers of the protrusions 14 are not brought into sliding contact with the seal sliding surface 10, compared with an arrangement in which the protrusions 14 are brought into sliding contact with the seal sliding surface 10 over the entire circumferential widths thereof, it is possible to reduce the sliding surface area, which greatly influences the seal torque. These factors all contribute to reduced seal torque in the first specific embodiment.

The maximum particle diameter of foreign objects that can pass through the oil passages 15 can be determined based on the height h of each protrusion 14 in the direction perpendicular to the seal sliding surface 10. Thus, in the first specific embodiment, it is possible to freely determine the minimum particle diameter of foreign objects that cannot pass through the oil passages 15 into the bearing interior space 6.

For example, if the bearing assembly is used in an environment where there is wear dust from metal gear, such as in an vehicle transmission to support a rotary portion of the transmission, the heights h of the protrusions 14 may be determined to block wear dust having particle diameters larger than 0.05-0.3 mm, as foreign objects that could cause premature damage to the rolling bearing. If the heights h of the protrusions 14 are 0.3 mm or less, such wear dust is unable pass through the oil passages 15.

For smooth flow of oil through the oil passages 15, the heights h of the protrusions 14 are preferably 0.05 mm or over.

Since the protrusions 14 are formed on the seal lip 9 in the first specific embodiment, the seal sliding surface 10 may be a cylindrical surface or a groove having the same section over the entire circumference thereof, and formed directly on one of the raceways, so that the seal sliding surface 10 can be formed easily. Since the protrusions 14 are formed so as to be integral with the seal lip 9 when forming the seal lip 9 by vulcanization, the protrusions 14 can be formed easily.

Figure 4:
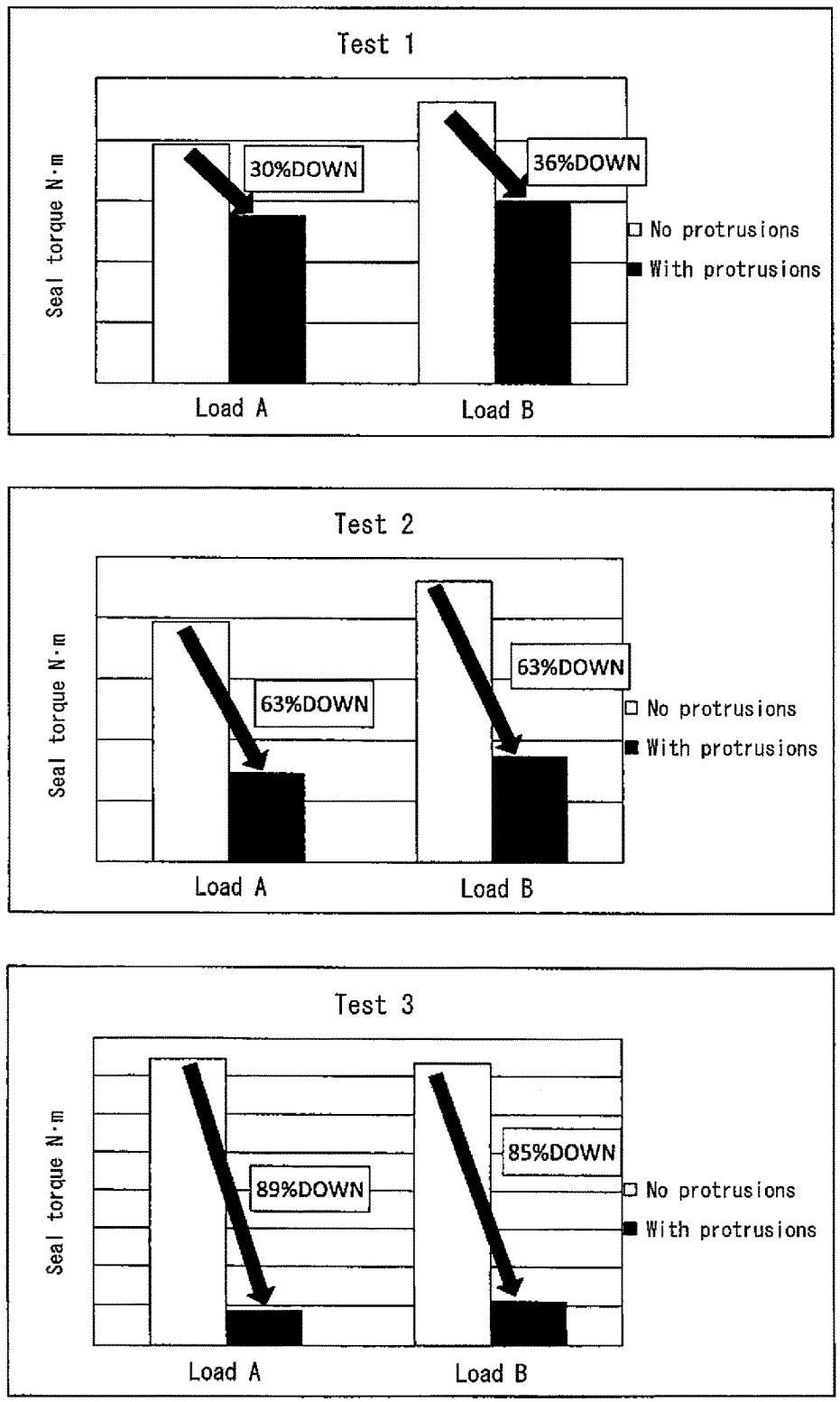
FIG. 4 shows test results of the first specific embodiment.

Tests were conducted to evaluate the influence of the protrusions 14 on the seal torque. The test results are shown in FIG. 4. In each of Tests 1-3, radial loads A and B (A<B) were applied to a test sample which is a sealed bearing assembly having the protrusions 14 and thus corresponding to the first specific embodiment, and a test sample which is identical to the first-mentioned test sample except that it has no protrusions 14. In each of Tests 1-3, the interferences of the two test samples were the same, while in Test 1, the interferences of the two test samples were set slightly higher than in Test 2, and significantly lower than in Test 3. Lubricating oil used in Test 1 was different in kind from lubricating oil used in Tests 2 and 3. Other test conditions were substantially the same among Tests 1-3.

In Test 1, the seal torque for the sample with the protrusions 14 was 30% lower at load A and 36% lower at load B, than the seal torque for the sample without the protrusions 14. In Test 2, the seal torque for the sample with the protrusions 14 was 63% lower both at loads A and B than the seal torque for the sample without the protrusions 14. In Test 3, the seal torque for the sample with the protrusions 14 was 89% lower at load A and 85% lower at load B, than the seal torque for the sample without the protrusions 14. Thus, the results of Tests 1-3 confirmed that the protrusions 14 are effective to reduce the seal torque irrespectively of a difference in interference, a difference in the kind of lubricating oil, and a difference in load applied.

Especially in Tests 2 and 3, the protrusions of the seal lip did not substantially become worn, and there were no marks that indicate that portions of the seal lip other than the protrusions contacted the seal sliding surface. This is presumably because although for only a short period of time of the entire test period immediately after the bearing begins to rotate, boundary lubricating condition is predominant between the seal lip and the seal sliding surface because during this period, the bearing operating speed is low, so that the peripheral speed of the seal sliding surface relative to the seal lip is too low to generate a sufficient wedge effect, except for this short period of time, i.e., substantially during the entire test period, the bearing operating speed is high, and thus the above-mentioned peripheral speed is sufficiently high to generate a sufficient wedge effect, so that fluid lubricating condition is created between the seal lip and the seal sliding surface.

Figure 5:
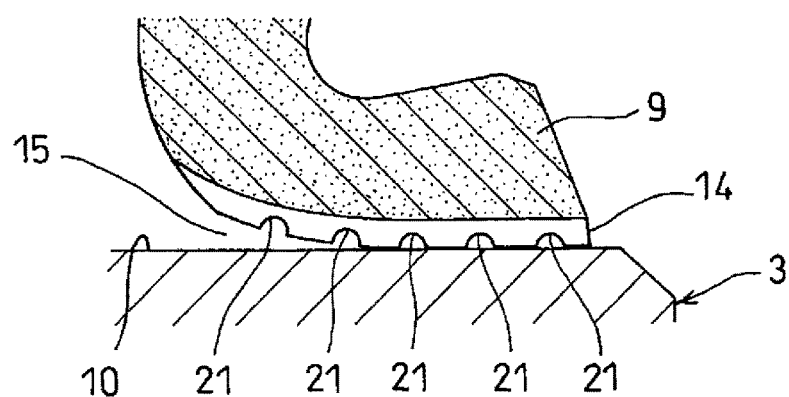
FIG. 5 is a sectional view of a second specific embodiment of the present invention, showing a seal lip thereof.

The second specific embodiment is now described with reference to FIG. 5. Here, only what differs from the first specific embodiment is described. As shown, each protrusion 14 is formed with grooves 21 extending across the protrusion 14 in the circumferential direction, and equidistantly spaced apart from each other so that as the bearing rotates, lubricating oil in the oil passages 15 enters the grooves 21. Thus, in the second specific embodiment, oil film can be further easily formed between the seal lip 9 and the seal sliding surface 10. The grooves 21 also serve to further reduce the sliding contact area between the seal lip 9 and the seal sliding surface 10, which significantly influences the seal torque, compared to the arrangement of the first specific embodiment. Instead of the plurality of grooves 21, a single such groove 21 may be formed on each protrusion 14. Even a single groove 21 would be capable of guiding lubricating oil in the oil passages 15 deep into the protrusion 14 in the circumferential direction, thus making it possible to more effectively form oil film between the protrusion 14 and the seal sliding surface 10.

Figure 6:
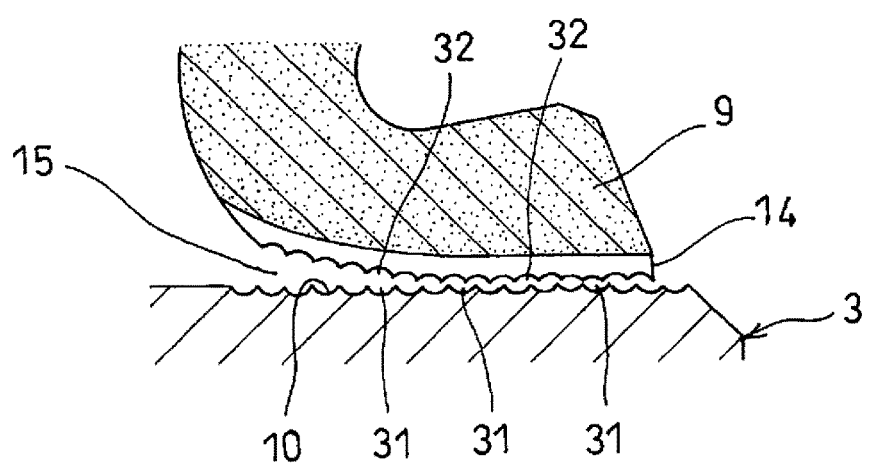
FIG. 6 is a sectional view of a third specific embodiment of the present invention, showing a seal lip and a seal sliding surface thereof.

The third specific embodiment is now described with reference to FIG. 6. As shown, the seal sliding surface 10 and each protrusion 14 are formed with minute undulations by shot peening. In FIG. 6, such undulations are shown in an exaggerated manner. Since such undulations by shot peening are actually so small that the undulations on the seal sliding surface 10 are ignorable compared with the height of the protrusions 14. For example, the seal sliding surface 10 has a maximum height roughness Rz of 2.5 micrometers or less, in which Rz is a maximum height roughness defined under JIS B0601: 2013. The undulations on the protrusions 14 may be formed first by forming, by shot peening, undulations on the surface of a mold for forming the seal lip 9, and then transferring the undulations on the surface of the mold onto the protrusions 14 when forming the seal lip 9 by molding. In the third specific embodiment, since lubricating oil is trapped in the numerous minute recesses 31 of the undulations on the seal sliding surface 10, and the numerous minute recesses 32 of the undulations on the protrusions 14, oil film can be formed more easily between the seal lip 9 and the seal sliding surface 10. While either the minute recesses 31 of the seal sliding surface 10, or the minute recesses 32 of the protrusions 14 may be omitted, at least the minute recesses 32 on the protrusions 14 are preferably not omitted so that oil film is easily formed on the surfaces of the protrusions 14, which tend to become relatively severely worn.

While, in any of the above specific embodiments, the protrusions are arranged at equal intervals in the circumferential direction, the protrusions may be arranged at unequal intervals, or instead of the plurality of protrusions, a single such protrusion may be formed on each seal lip. Even a single such protrusion would be capable of defining oil passages, and also capable of reducing the seal torque.

While, in any of the above specific embodiments, the oil passages extend in straight lines to ensure smooth flow of oil, the protrusions may be provided in a random dot pattern so that the oil passages form a network pattern.

While, in any of the above specific embodiments, the seal members each comprises a metal core and a vulcanized rubber section, the seal members may be each formed of a single material, provided it is possible to fit the seal lip with required interference. For example, such single-material seal members may be of a rubber or a resin.

While, in any of the above specific embodiments, the seal lips are radial seal lips, the present invention is equally applicable to axial seal lips, which contact the seal sliding surfaces in the axial direction.

While, in any of the above specific embodiments, the bearing is a radial bearing of which the inner race is rotated, the present invention is equally applicable to a radial bearing of which the outer race is rotated, and a thrust bearing.

Figure 7:
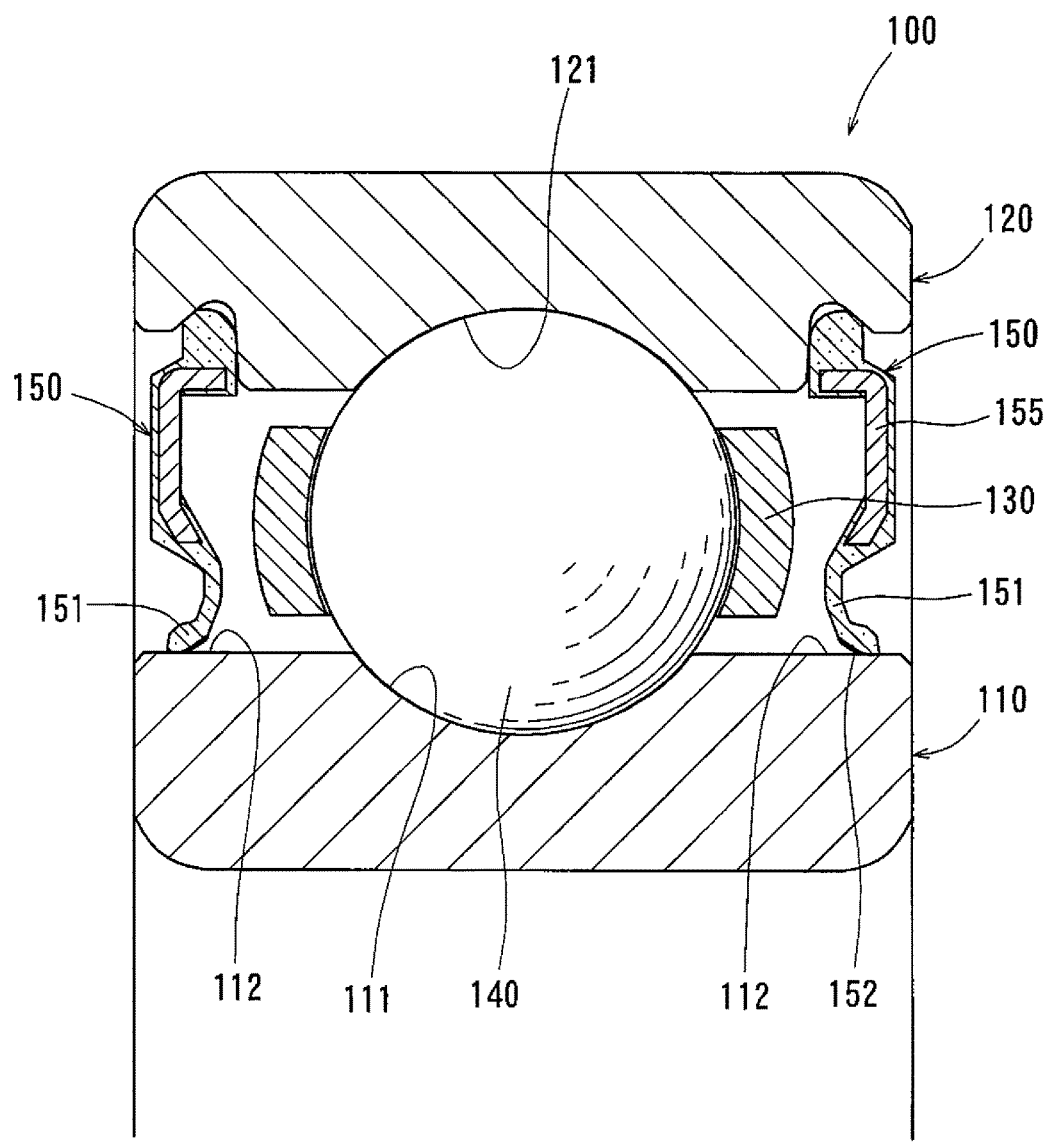
FIG. 7 is a sectional view of a sealed bearing assembly according to a fourth specific embodiment of the present invention.

The fourth specific embodiment is now described with reference to FIGS. 7-17. The sealed bearing assembly 100 of the fourth specific embodiment, shown in FIG. 7, is intended to be used in a vehicle transmission. Ordinarily, oil is supplied to a sealed bearing assembly in a vehicle transmission by splashing, from an oil bath, or by nozzle injection. Therefore, lubricating oil exists around the seal lips of the seal members fixed to the inner race or the outer race of such a sealed bearing assembly. Lubricating oil used for such a sealed bearing race is also used to lubricate parts of the transmission to be lubricated, such as gears. Such lubricating oil is circulated by an oil pump, and filtered by an oil filter provided in the circulation path of the lubricating oil.

Figure 8:
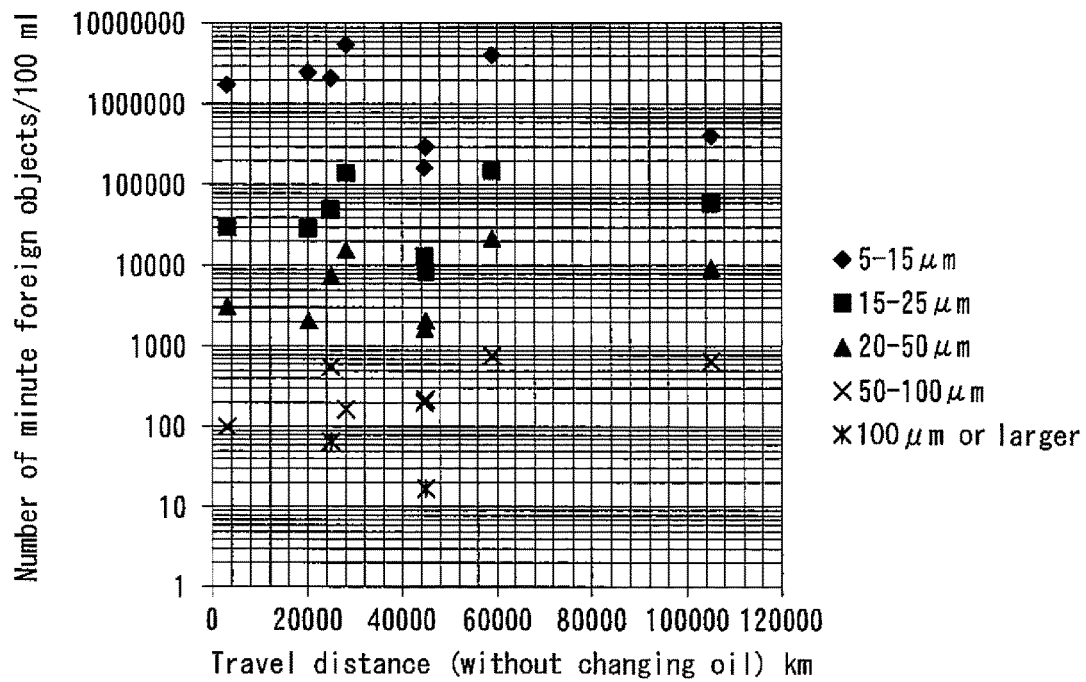
FIG. 8 shows the numbers of foreign objects in lubricating oil in vehicle transmissions (AT/MT) for respective particle diameter ranges.
Figure 9:
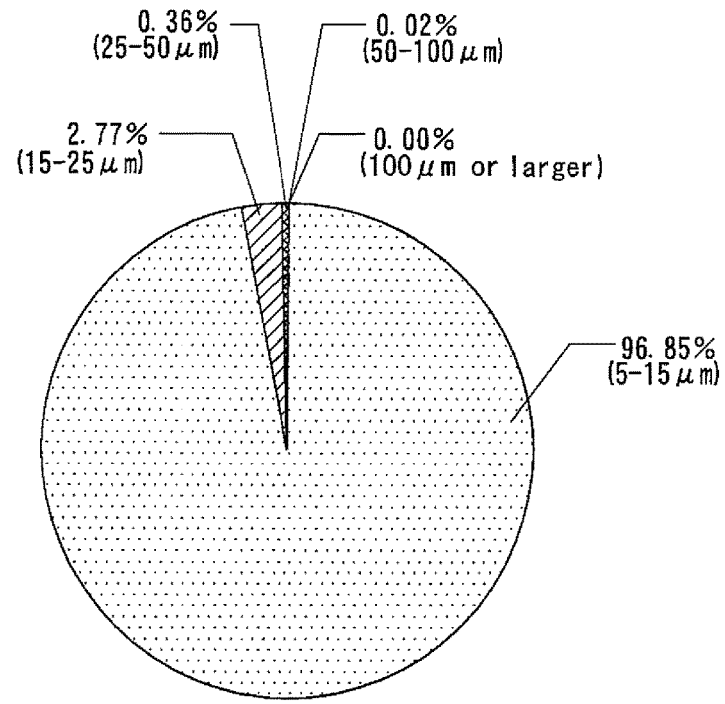
FIG. 9 is a circular graph showing the percentages of foreign objects in the respective particle diameter ranges shown in FIG. 8.

The inventors of the present application recovered lubricating oil from eight automatic transmission (AT) or manual transmission (MT) vehicles which had been actually used on the road, and whose odometer readings were different from each other. Then, for the lubricating oil recovered from each of the eight vehicles, the numbers of foreign objects in the lubricating oil for respective ranges of the particle diameters of the foreign objects were counted, and are shown in the graph of FIG. 8. The materials of the foreign objects were also investigated. In the graph of FIG. 8, the vertical axis indicates, on logarithmic scale, the number of foreign objects per 100 ml of lubricating oil in each of particle diameter ranges of not less than 5 μm and less than 15 μm, not less than 15 μm and less than 25 μm, not less than 20 μm and less than 50 μm, not less than 50 μm and less than 100 μm, and not less than 100 μm. The horizontal axis indicates the travel distances of the respective vehicles. Foreign objects having diameters smaller than 5 μm were not counted. The numbers of foreign objects in the respective particle diameter ranges were counted by a microscopic foreign objects weighing method, using a measuring machine made by Hiac Royco, Model No. 8000 A. The circular graph of FIG. 9 shows the percentages (in number) of the foreign objects in the respective particle diameter ranges shown in FIG. 8.

Figure 10:
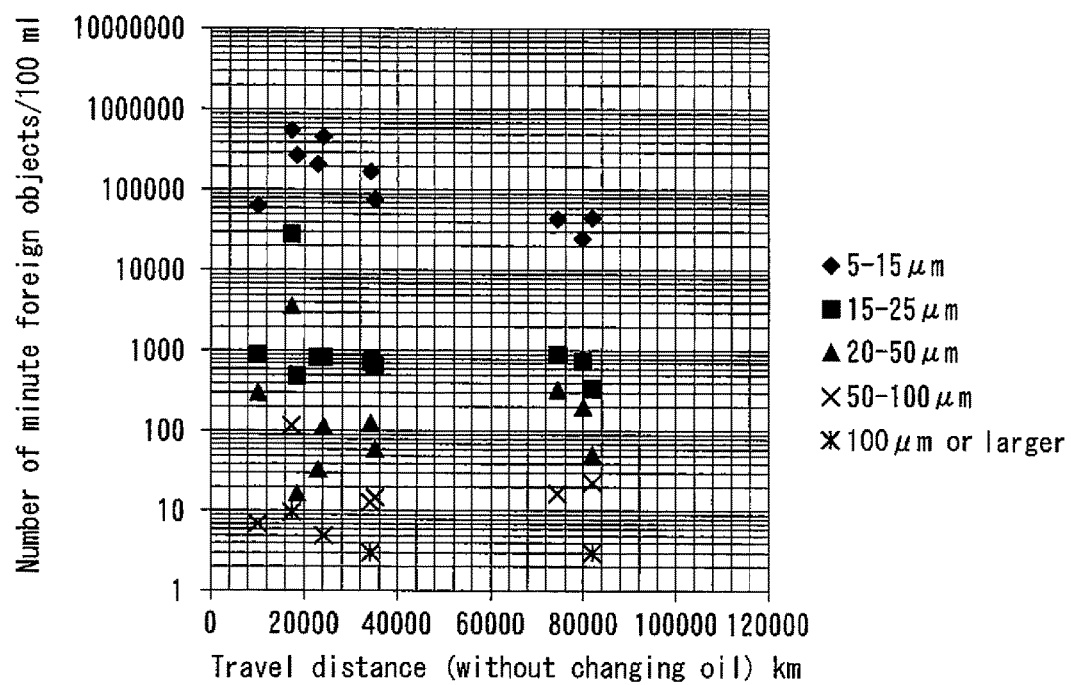
FIG. 10 shows the numbers of foreign objects in lubricating oil in vehicle transmissions (CVT) for respective particle diameter ranges.
Figure 11:
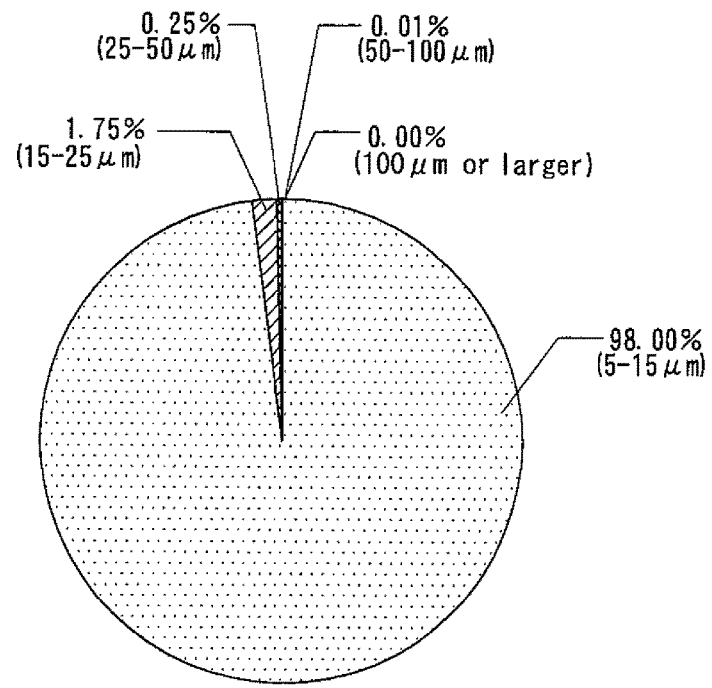
FIG. 11 is a circular graph showing the percentages of foreign objects in the respective particle diameter ranges shown in FIG. 10.

FIG. 10 is a graph similar to FIG. 8 and showing the numbers of foreign objects in the respective particle diameter ranges for lubricating oil recovered from ten continuously variable transmission (CVT) vehicles. The circular graph of FIG. 11 shows these numbers in percentage. While the manufactures, the makes, and the travel distances of the abovementioned eight and ten vehicles vary, comparison of FIGS. 8 and 9 with FIGS. 10 and 11 reveals that foreign objects in the lubricating oil from the AT/MT vehicles, in which a larger number of gears are used, are larger in particle diameter and number than those in the lubricating oil from the CVT vehicle. Irrespective of the type of the transmission, the number of foreign objects in the particle diameter range of not more than 50 μm accounted for 99.9% or over of the total number of foreign objects in the lubricating oil. The number of foreign objects larger in particle diameter than 50 μm was less than 1000 for an AT/MT vehicle, and less than 200 for a CVT vehicle, irrespective of the travel distance. This indicates that due to improved performance of today's oil filters, foreign objects remaining in lubricating oil in today's vehicles are smaller in size (as a result of larger foreign objects being removed by oil filters).

Next, investigation was made, if lubricating oil in the bearing interior contains foreign objects, of the relationship between the numbers of such foreign objects in the respective particle diameter ranges, and the life of the (rolling) bearing. The investigation revealed that while the larger the number of foreign objects having larger particle diameters, the shorter the bearing life tends to be, if the number of foreign objects having particle diameters larger than 50 μm is sufficiently small as in the environment in today's transmissions, even if a bearing in such a transmission has no seals, and thus the lubricating oil in the transmission can freely flow into the bearing, the life ratio of the bearing (ratio of the actual life of the bearing to the calculated life) is sufficient for actual use in an automotive transmission (for example, this ratio is about 7 to 10).

Based on this discovery, it can be said that if a sealed bearing used to support a rotary portion of a vehicle drive member such as a transmission or a differential includes seal members capable of preventing foreign objects having particle diameters of more than 50 μm from entering the bearing interior, and if lubricating oil is supplied after being filtered by an oil filter, the bearing life will never be influenced by foreign objects even though foreign objects having particle diameters of 50 µm or less can enter the bearing interior. By configuring the seal members such that foreign objects having particle diameters of 50 µm or less can enter the bearing interior, sufficient amount of lubricating oil can pass through the space between each seal lip and the seal sliding surface, so that in cooperation with the above-described wedge effect, it is possible to create fluid lubricating condition between the seal lip and the seal sliding surface.

The sealed bearing assembly 100 shown in FIG. 7 is capable of creating such fluid lubricating condition, and includes an inner race 110, an outer race 120, a plurality of balls 140 retained by a retainer 130, and two seal members 150 sealing the respective two ends of the bearing interior space defined by the inner race 110 and the outer race 120.

The sealed bearing assembly 100 is a deep groove ball bearing assembly. The inner race 110 and the outer race 120 have raceway grooves 111 and 121, respectively, each covering, in transverse section (section of FIG. 7), about a third of the circumference of each ball 140, and extending continuously over the entire circumferences of the inner race 110 and the outer race 120.

Figure 12:
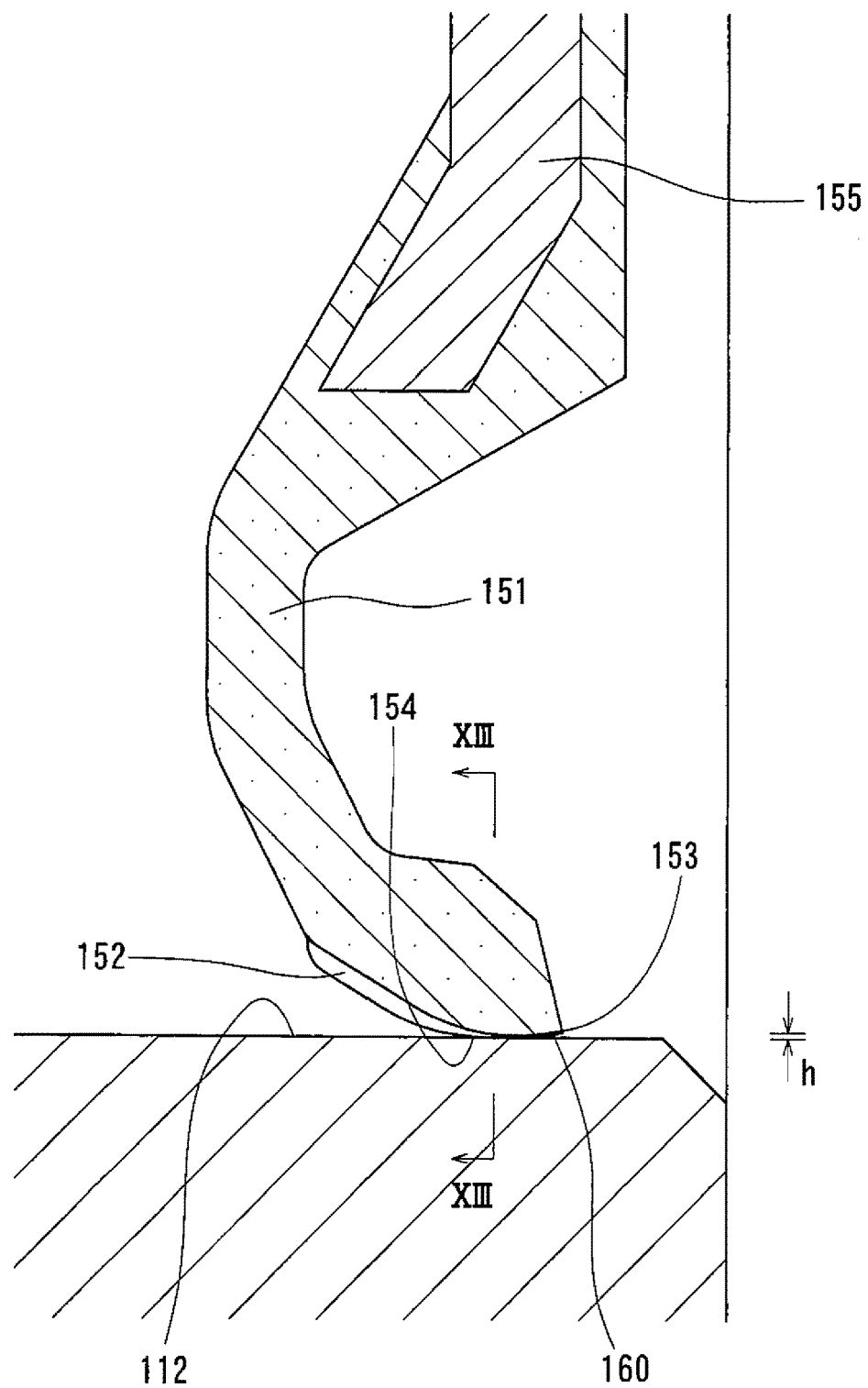
FIG. 12 is an enlarged view of and around a seal lip of a right (in FIG. 7) seal member.
Figure 13:
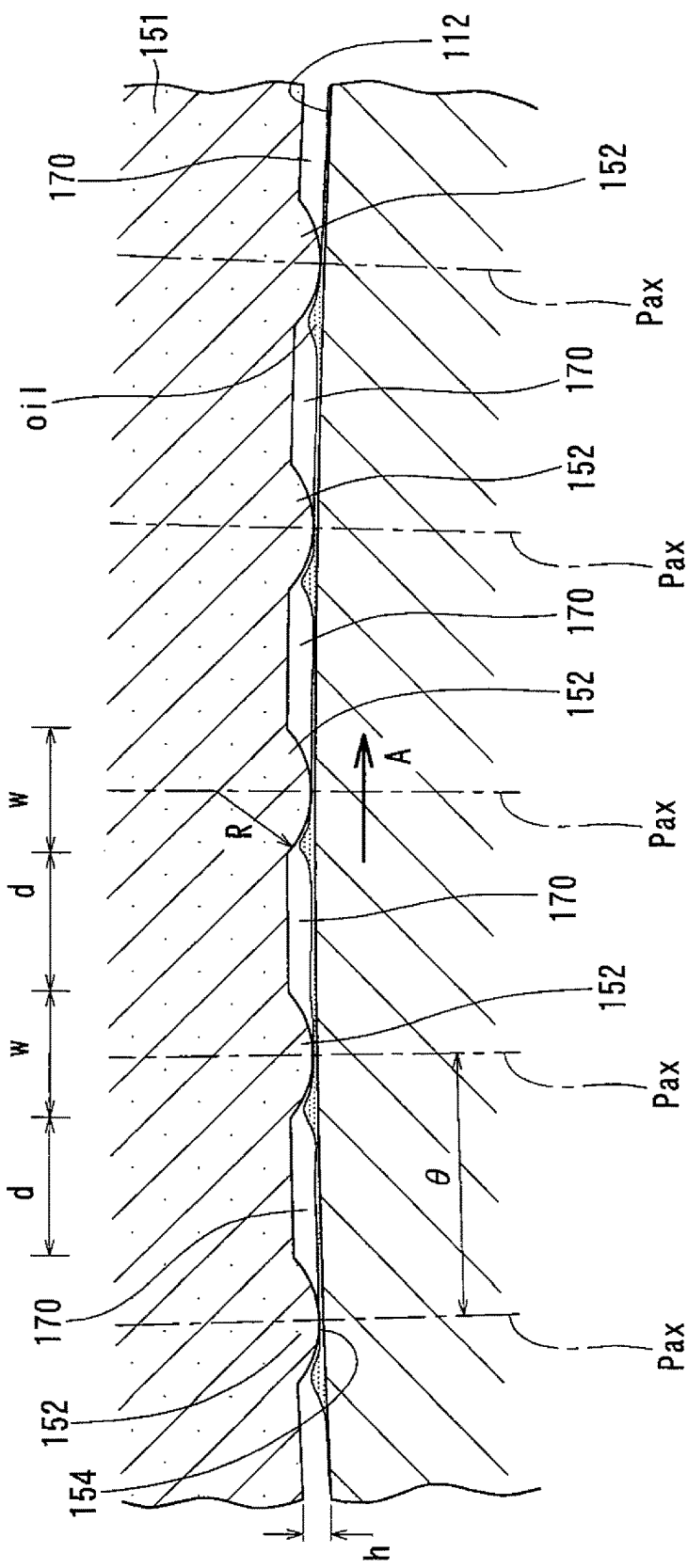
FIG. 13 is an enlarged sectional view taken along line XIII-XIII of FIG. 12.
Figure 14:
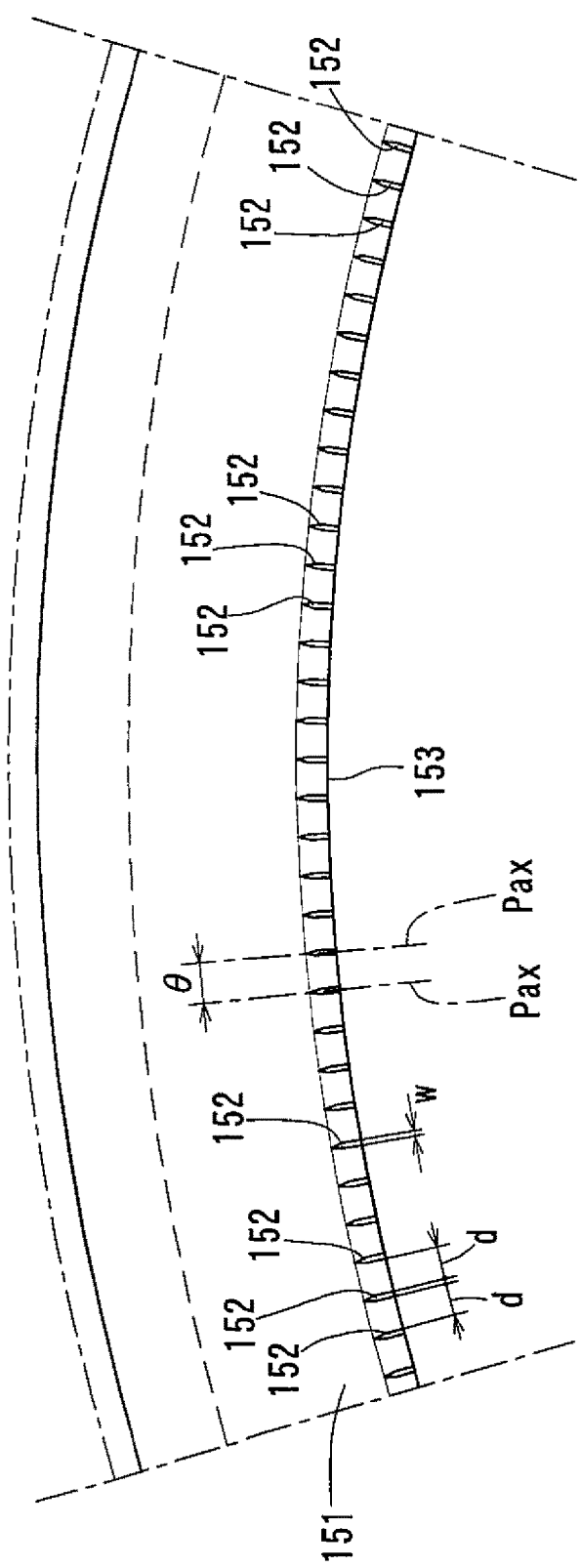
FIG. 14 is a partial front view of a seal lip of the fourth specific embodiment, as seen in the axial direction.

FIG. 12 shows an enlarged view of and around the seal lip 151 of one of the seal members 150 of FIG. 7. FIG. 13 shows a sectional view taken along line XIII-XIII of FIG. 12. The seal member 150 is designed such that the gaps between the seal lip 151 and the seal sliding surface 112 (including the gaps defined by the oil passages 160) in the direction perpendicular to the seal sliding surface 112 are the narrowest at the section of FIG. 13. FIG. 14 shows the contour of the seal lip 151 as seen in the axial direction from the bearing interior space while the seal member 150 is not yet mounted on the bearing and thus not deformed by an external force. (This state is hereinafter referred to as the "unstressed state".)

As shown in FIGS. 12 and 13, the seal lip 151 and the seal sliding surface 112 are shaped and arranged in such a manner that the (solid) protrusions 152 are not substantially deformed (i.e., not deformed such that the lubricating properties between the protrusions 152 and the seal sliding surface 112 are affected) due to the wrapping force of the seal lip 151 and the oil pressure of lubricating oil when the seal lip 151 is elastically deformed due to the interference between the seal lip 151 and the seal sliding surface. Thus, the protrusions 152 shown maintain the shape when the protrusions 152 are formed by vulcanization by transferring the shape of the mold.

As shown in FIG. 14, in the unstressed state, the seal lip 151 has a distal edge 153 defining the radially inner edge of the seal lip 151.

As shown in FIGS. 12-14, the protrusions 152 extend in the direction perpendicular to the circumferential direction, to the distal edge 153 of the seal lip 151, and over the entire axial extent of the seal lip 151 that is fitted on the seal sliding surface 112 with radial interference.

The protrusions 152 are arranged at regular circumferential intervals d. In other words, when the seal lip 151 is seen in the axial direction, the protrusions 152 are arranged radially at regular angular pitches 8 corresponding to the circumferential intervals d, i.e., lie on radial lines extending from the center axis of the seal member 150. (This center axis is not shown, and coincides with the center axis of the bearing).

Since the radially extending protrusions 152 are provided around the distal edge 153 of the seal lip 151, by suitably determining the circumferential intervals d, i.e., the distances between the respective circumferentially adjacent pairs of protrusions 152, and the circumferential widths w of the respective protrusions 152, it is possible to bring the seal lip 151 into sliding contact with the seal sliding surface 112 only at the protrusions 152, and thus to always define the oil passages 160 between the protrusions 152.

The seal lip 151 is designed such that the portions of the protrusions 152 that can be brought into sliding contact with the seal sliding surface 112 have a maximum height h of 0.05 mm. The interference between each protrusion 152 and the seal sliding surface 112 is the highest at the portion of the protrusion 152 having the maximum height h. Since deformation of the protrusions 152 during operation of the bearing is ignorable, the gaps between the seal lip 151 and the seal sliding surface 112 (including the gaps defined by the oil passages 160) in the direction perpendicular to the seal sliding surface 112 are equal to the maximum height h of the protrusions 152, and do not substantially exceed 0.05 mm, at their narrowest portions. Thus, it is possible to substantially prevent foreign objects having particle diameters of more than 50 µm in lubricating oil from passing through the oil passages 160.

Each protrusion 152 has a rounded shape such that the distance between the protrusion 152 and the seal sliding surface 112 decreases from its ends toward its center with respect to the circumferential width w thereof, over the entire radial length of the protrusion 152. The rounded shape of each protrusion 152 allows the protrusion 152 to come into sliding contact with the seal sliding surface 112 along a linear area on an imaginary axial plane Pax which passes through the center of the protrusion 152 with respect to its circumferential width, and on which the rounded shape of the protrusion 152 has its center of curvature.

When the seal sliding surface 112 rotates in the direction of arrow A in FIG. 13 relative to the seal lip 151, lubricating oil (indicated by dots in FIG. 13) in the oil passages 160 is pulled into wedge-shaped gaps between the protrusions 152 and the seal sliding surface 112. Since each wedge-shaped gap has such a wedge angle as to gradually decrease from its wide end facing the oil passage 160, in which there is lubricating oil to be pulled into the wedge-shaped gap, toward its narrow end, the closer to the linear area (on the imaginary axial plane Pax) along which the protrusion 152 can come into sliding contact with the seal sliding surface 112, the stronger the wedge effect tends to be. This effectively increases the oil pressure of the oil film at the linear area to such an extent that the protrusion 152 is completely separated from the seal sliding surface 112, and the oil film becomes thick at the linear area. This in turn makes it easier to create fluid lubricating condition between the protrusion 152 and the seal sliding surface 112.

If the protrusion 152 is completely separated from the seal sliding surface 112 by oil film, there exists fluid lubricating condition, in which the seal sliding surface 112 slides relative to the protrusion 152 while not in direct contact with the protrusion 152. By forming such oil film between each protrusion 152 and the seal sliding surface 112, fluid lubricating condition is created between the seal lip 151 and the seal sliding surface 112.

In order to easily create such fluid lubricating condition, the wrapping force with which the seal lip 151 is wrapped around the seal sliding surface 112, and which corresponds to the interference between the seal lip 151 and the seal sliding surface 112 is preferably as small as possible. For this purpose, the above-mentioned base portion of the seal lip is preferably as thin as possible.

The smaller the maximum height roughness Rz, the smaller the thickness of oil film necessary to create fluid lubricating condition can be. Thus, the seal sliding surface 112 is not subjected to shot peening so that the maximum height roughness Rz is less than 1 μm.

The smaller the distances d between the circumferentially adjacent pairs of protrusions 152, i.e., the larger the number of the protrusions 152, the larger number of protrusions 152 any point of the seal sliding surface 112 passes when the seal sliding surface 112 rotates once relative to the seal lip 151. This makes it easier to form a continuous oil film over the entire circumference of the seal sliding surface 112, and to eliminate any portion where oil is not subjected to the wedge effect between each protrusion 152 and the seal sliding surface 112, so that fluid lubricating condition can be created more easily.

The larger the rounded shape of each protrusion 152 (i.e., the radius of curvature of the surface 154 of the protrusion 152), the more easily the wedge effect is created.

Figure 15:
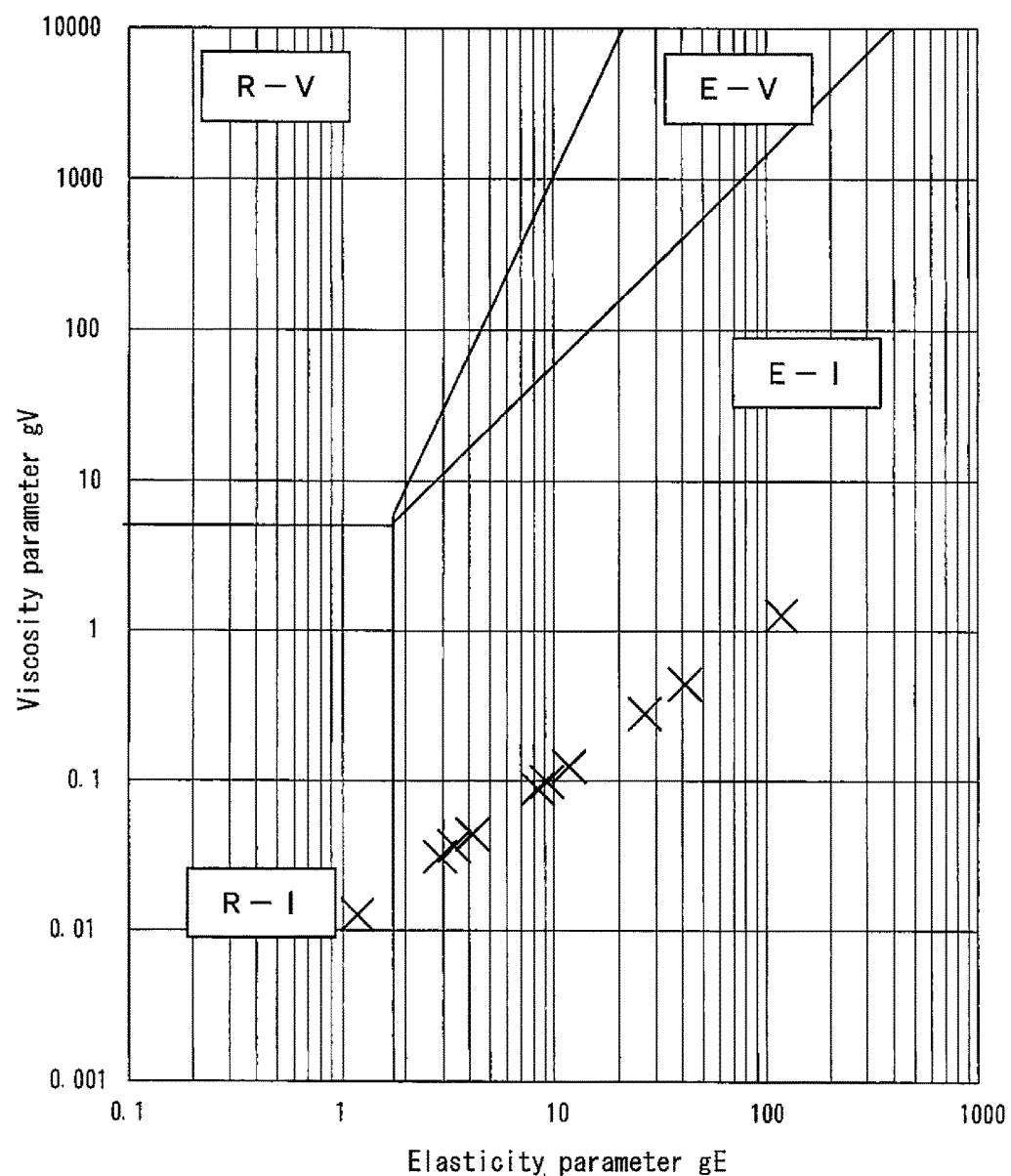
FIG. 15 is a lubrication region chart showing a fluid lubricating mode in the fourth specific embodiment.

The inventors of the present application calculated the theoretical oil film thickness between the protrusions 152 and the seal sliding surface 112 when the heights h of the protrusions 152 are 0.05 mm, the intervals d between the protrusions 152 are not less than 0.3 mm and not more than 2.6 mm, the circumferential widths w of the protrusions 152 are not less than 0.2 mm and not more than 0.7 mm, and the rounded shape of the protrusions 152 is not less than 0.15 mm and less than 1.0 mm, with the peripheral speed of the seal sliding surface 112 (i.e., the speed at which the seal sliding surface 112 rotates in the circumferential direction relative to the seal lip 151) within the range of 0.02-20.2 m/s. In this calculation, "CVTF" was simulated, in which a pulley and a belt of a CVT were lubricated, when the oil temperature was 30° C. and 120° C. The calculation results revealed that under these use conditions, in a lubrication region chart for line contact based on viscosity parameter $g_v$ and elasticity parameter $g_e$, which are non-dimensional numbers determined by Greenwood and Johnson, lubricating oil is distributed in either one of the equiviscous-rigid body region (R-I lubricating mode) and the equiviscous-elastic body region (E-I mode, soft EHL), which means fluid lubricating condition. FIG. 15 shows the distribution of the calculation results in the above-described lubrication region chart.

Figure 16:
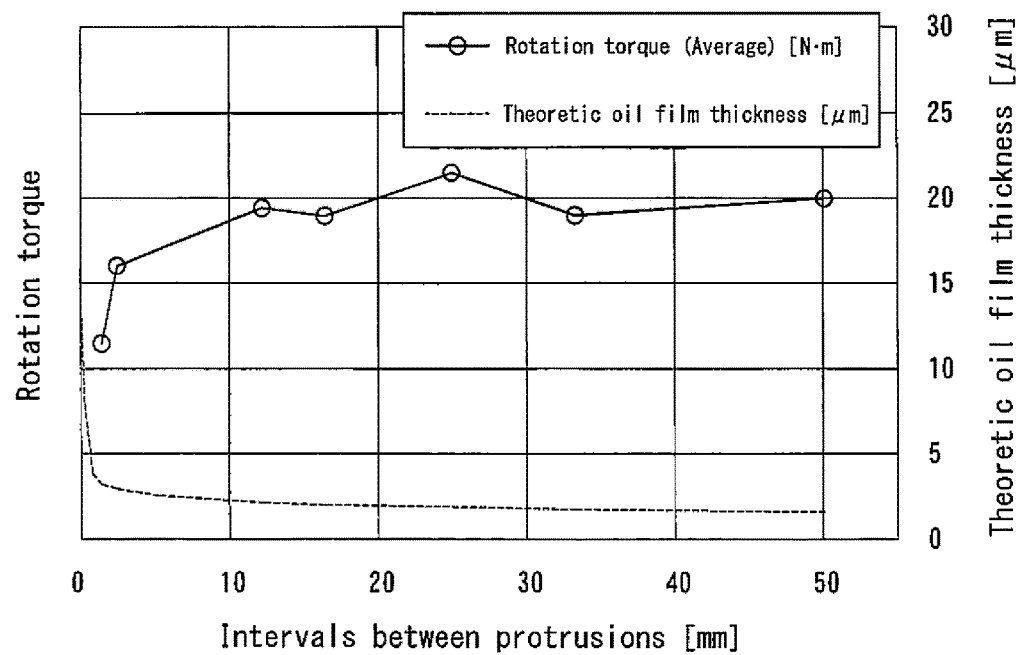
FIG. 16 is a graph showing, in the fourth specific embodiment, the relationship between the intervals between protrusions and the theoretical oil film thickness and between the intervals between protrusions and the bearing rotation torque.
Figure 17:
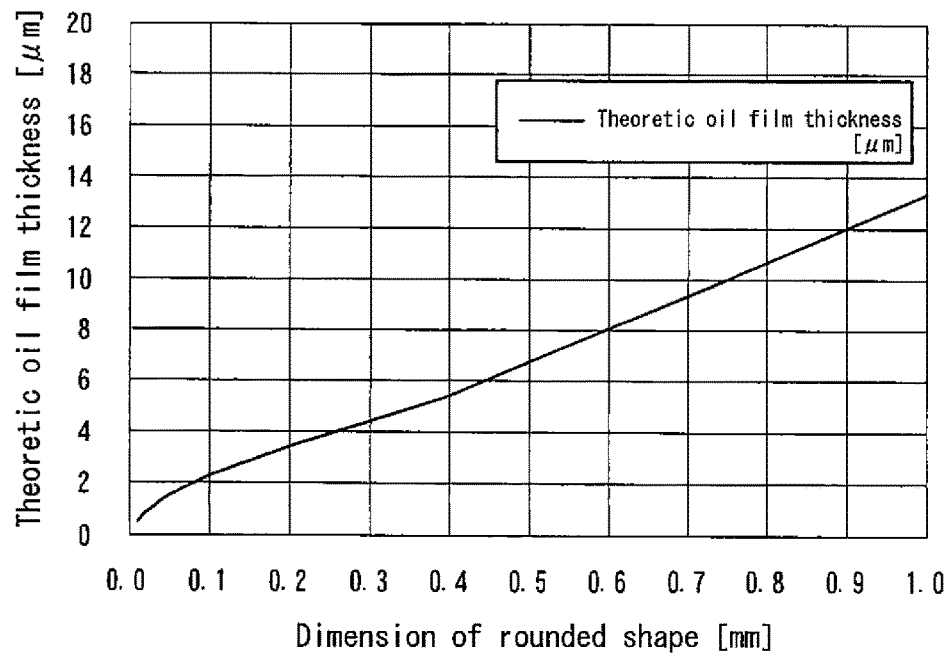
FIG. 17 is a graph showing, in the fourth specific embodiment, the relationship between the dimension of a rounded shape of protrusions and the theoretic oil film thickness.

The inventors of the present application discovered, by calculation, the relationship between the distance d between the protrusions 152, shown in FIGS. 13 and 14, and the theoretical oil film thickness between the protrusions 152 and the seal sliding surface 112. The inventors of the present invention further discovered, by calculation, the relationship between the rounded shape of the protrusions 152 and the theoretical film thickness between the protrusions 152 and the seal sliding surface 112. The theoretical oil film thickness was calculated using the minimum film thickness calculating equation of Martin for the R-I mode, or using the minimum film thickness calculating equation of Herrebrugh for the E-I mode. The inventors of the present application further discovered, by experiment, the relationship between the distance d between the protrusions 152 and the rotation torque of the sealed bearing assembly 100. FIG. 16 shows the relationship between the distance d between the protrusions 152 and the theoretical oil film thickness and between the distance d and the bearing rotation torque. FIG. 17 shows the relationship between the dimension of the rounded shape of the protrusions 152 and the theoretical oil film thickness. If the oil film between the protrusions 152 and the seal sliding surface 112 is too thin, the friction coefficient μ tends to be high. If too thick, it may become difficult to effectively prevent entry of foreign objects. Taking these factors into consideration, an optimum oil film thickness should be sought within the range larger than the maximum height roughness Rz.

FIG. 16 shows that, theoretically, if the distance d between the protrusions 152 is 2.6 mm, an approximately 3-μm-thick (i.e., way thicker than the maximum height roughness Rz of less than 1 μm) oil film is formed between the protrusions 152 and the seal sliding surface 112, and where the distance d is smaller than 2.6 mm, the oil film thickness tends to increase as the distance d decreases. FIG. 16 further shows that where the distance is 2.6 mm or less, the rotation torque (i.e., the seal torque) tends to decrease as the distance d decreases. The distance d between the protrusions 152 may be therefore 2.6 mm or less. If the distance d between the protrusions 152 is less than 0.3 mm, it becomes difficult to form the seal lip 151 using a mold. Thus, the distance d is preferably 0.3 mm or over.

FIG. 17 shows that, theoretically, if the radius of curvature of the rounded shape of the protrusions 152 is 0.15 mm, an approximately 3-μm-thick oil film is formed. Thus, if the height h of the protrusions 152 is 0.05 mm, and considering the fact that the seal lip is formed in a mold, the radius of curvature of the rounded shape of the protrusions 152 is preferably not less than 0.15 mm and less than 1.0 mm. Also, since the circumferential width w of the protrusions 152 is dependent upon the rounded shape of the protrusions 152, if the height h of the protrusions 152 is 0.05 mm, the radius of curvature of the rounded shape of the protrusions 152 is more preferably not less than 0.2 mm and not more than 0.7 mm.

In view of the above calculation results, in the fourth specific embodiment, the height h of the protrusions 152, shown in FIGS. 12-14, is 0.05 mm; the distance d between the protrusions 152 is not less than 0.3 mm and not more than 2.6 mm, the circumferential width w of the protrusions 152 is not less than 0.2 mm and not more than 0.7 mm; and the radius of curvature of the rounded shape of the protrusions 152 is not less than 0.15 mm and less than 1.0 mm. By providing the seal lip 151 with such protrusions 152, it is possible to create fluid lubricating condition between the seal lip 151 and the seal sliding surface 112 while the seal sliding surface 112 is rotating at a peripheral speed of 0.2 m/s or over. In this arrangement, while the peripheral speed of the seal sliding surface 112 is less than 0.2 m/s, boundary lubricating condition prevails between the protrusions 152 and the seal sliding surface 112. However, since a bearing in a vehicle transmission quickly reaches the peripheral speed of 0.2 m/s once it begins to rotate, fluid lubricating condition is created between the seal lip 151 and the seal sliding surface 112 substantially over the entire period of operation of the bearing.

With the sealed bearing assembly 100 of the fourth specific embodiment, the seal members 150 prevent entry of foreign objects having such large particle diameters as to detrimentally affect the life of the bearing, into the bearing interior space, while at the same time, fluid lubrication minimizes the friction coefficient μ due to sliding movement between the seal lip 151 and the seal sliding surface 112, thereby markedly reducing seal torque, and thus the rotation torque of the bearing (see FIGS. 7 and 13).

With the sealed bearing assembly 100 of the fourth specific embodiment, even while the bearing is being rotated at peripheral speeds at which conventional sealed bearing assemblies would suffer from such problems as wear of the seal lips, and heat buildup due to sliding movement between the seal lip and the seal sliding surface (e.g., at 30 m/s and over), since fluid lubricating condition keeps the seal lip 151 and the seal sliding surface 112 out of direct contact with each other, it is possible to keep the seal lip 151 practically free of wear, and to reduce heat buildup clue to sliding movement between the seal lip and the seal sliding surface. This in turn makes it possible to operate the sealed bearing assembly 100 of the fourth specific embodiment at speeds that were not attainable with conventional sealed bearing assemblies.

With the sealed bearing assembly 100 of the fourth specific embodiment, since the protrusions 152 have a rounded shape, they will never be bent in the circumferential direction even if rubbed against the seal sliding surface 112 when the seal member 150 is mounted to the outer race 120, so that the protrusions reliably maintain the ability to keep the seal torque low. If, on the other hand, the protrusions have angular ridges, the individual protrusions could be bent in either of the opposite circumferential directions by being rubbed against the seal sliding surface when mounting the seal member. Thus, it is extremely difficult to mount the seal member such that the protrusions are bent in the same direction in which wedge-shaped gaps are formed on the proper sides of the respective protrusions with respect to the direction in which the seal sliding surface rotates relative to the protrusions. As a result, no sufficient wedge effects are obtained at portions of the seal lip where there are protrusions that have been bent in the wrong direction, so that the protrusions as a whole will be unable to sufficiently reduce the seal torque.

Figure 18:
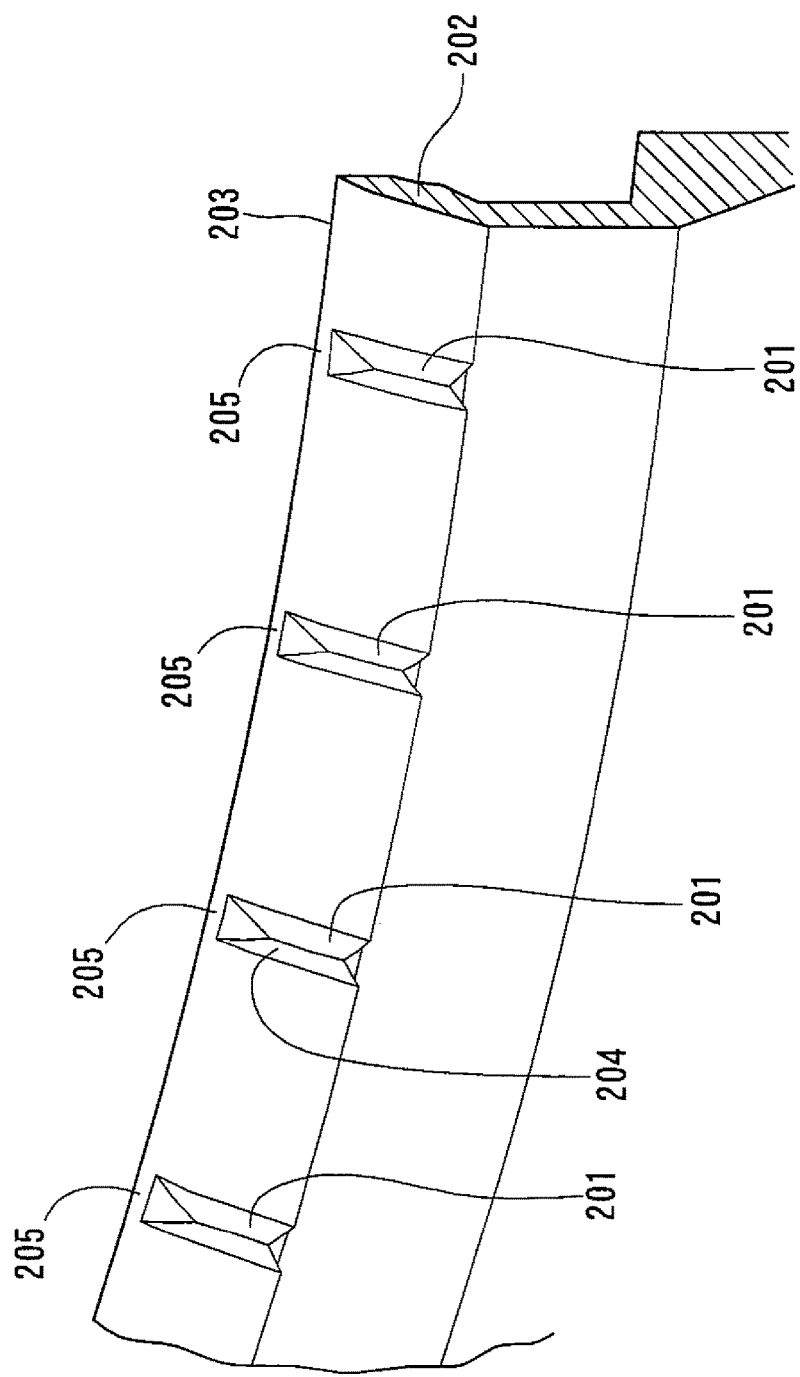
FIG. 18 is a partial perspective view of a seal lip of a fifth specific embodiment of the present invention.

The fifth specific embodiment is now described with reference to FIGS. 18-20B. The fifth specific embodiment differs from the fourth specific embodiment only in the shape of the protrusions. As shown in FIG. 18, the protrusions 201 of the fifth specific embodiment gradually decrease in height toward the distal edge 203 of the seal lip 202. FIG. 18 is an enlarged perspective view of a portion of the seal lip 202 including some of the protrusions 201 when the seal lip 202 is in an unstressed state. In order to gradually reduce the height of each protrusion 201 toward the distal edge of the seal lip 202, the radius of curvature of the rounded surface 204 of the protrusion 201 is gradually increased, while the center of curvature of the rounded surface 204 is gradually moved outwardly, toward the distal edge 203 of the seal lip 202.

The heights of the protrusions 201 are practically zero at the distal edge 203 of the seal lip 202. In other words, the protrusions 201 terminate short of the distal edge 203 of the seal lip 202, so that there is a flat surface 205 extending the entire circumference of the seal lip 202 between the protrusion 201 and the distal edge 203 of the seal lip 202. Thus, the distal edge 203 of the seal lip 202 forms a boundary between the flat surface 205, which extends the entire circumference of the seal lip 202 in the bearing interior space, and the outer surface of the seal lip 202, which extends the entire circumference of the seal lip 202, and which crosses the flat surface 205 along the boundary.

Figure 19A:
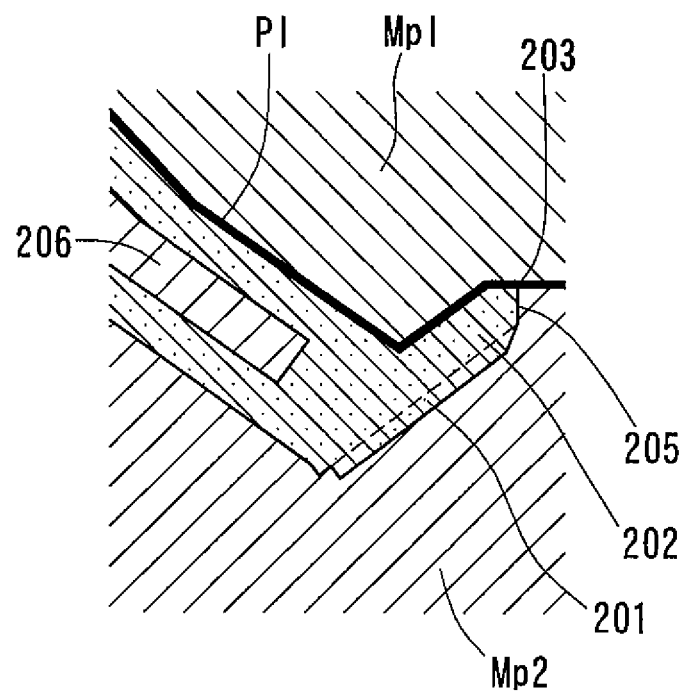
FIG. 19A schematically shows how the seal lip of FIG. 18 is formed by vulcanization.
Figure 19B:
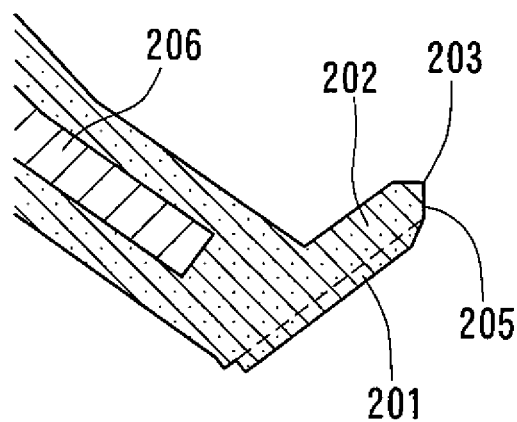
FIG. 19B schematically shows the seal lip formed in FIG. 19A.

FIGS. 19A and 19B show how the seal lip 202 is formed by vulcanization. For better understanding, FIGS. 19A and 19B only schematically show the shape of the seal lip 202, and other elements. The seal lip 202 is formed by attaching, by vulcanization, a rubber sheet to the metal core 206. During vulcanization, the rubber portion of the seal member, including the seal lip 202, is formed by sandwiching the rubber sheet between the upper mold Mp1 and the lower mold Mp2. The upper mold Mp1 upper mold Mp1 is arranged over the lower mold Mp1 with respect to the vertical direction such that the vertical direction corresponds to the axial direction of the bearing. Therefore, the distal edge 203 of the seal lip 202, which defines the radially inner edge of the seal lip 202 in its unstressed state, forms a boundary between the upper surface of the seal lip 202, which is in contact with the transfer surface of the upper mold Mp1, and the lower surface of the seal lip 202, which is in contact with the transfer surface of the lower mold Mp2. In other words, the distal edge 203 of the seal lip 202 is located on the parting line P1 of the upper mold Mp1 and the lower mold Mp2, where the upper mold Mp1 and the lower mold Mp2 meet.

Figure 20A:
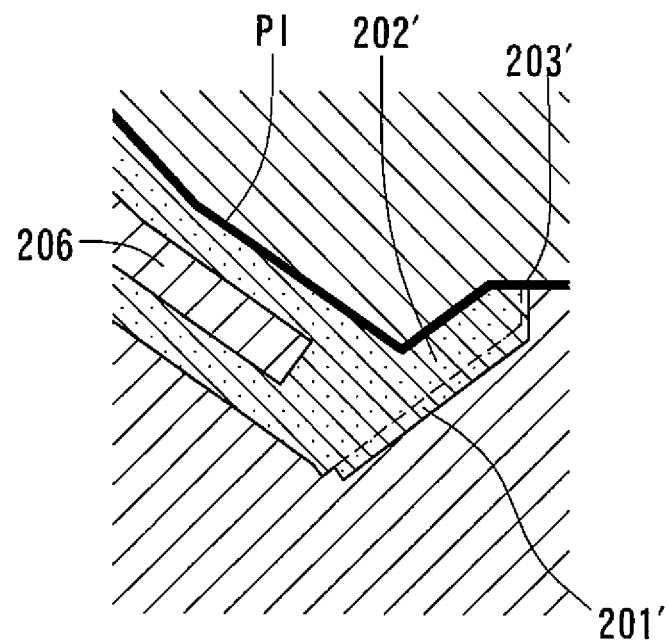
FIG. 20A schematically shows how an imaginary seal lip is formed by vulcanization.
Figure 20B:
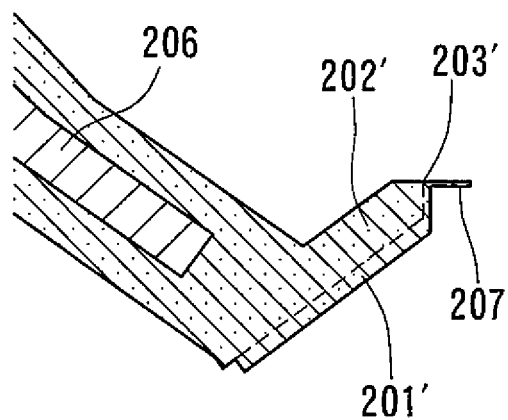
FIG. 20B schematically shows the seal lip formed in FIG. 20A.

FIGS. 20A and 20B show a hypothetical seal lip 202' of which the protrusions 201' extend up to the distal edge 203' of the seal lip 202'. In this case, since undulations for forming such protrusions 201' extend up to the parting line P1, burrs 207 as shown in FIG. 20B tend to be formed after vulcanization. If such burrs 207 separate from the seal lip 202' during operation of the bearing, they could clog oil filters and lubricating oil circulating paths.

On the other hand, by providing, as shown in FIGS. 19A and 19B, the flat surface 205 between the protrusions 201 and the distal edge 203 of the seal lip 202, undulations for forming the protrusions 201 do not extend to the parting line P1, so that no burrs 207 as shown in FIGS. 20A and 20B are formed. The arrangement of the fifth specific embodiment thus prevents the formation of burrs at the distal edge 203 of the seal lip 202 of the seal member 202 when forming the seal lip 202 by vulcanization.

In the fifth specific embodiment, the heights of the protrusions 201 are zero at the distal edge 203 of the seal lip 202, and there is the flat surface 205 between the protrusions 201 and the distal edge 203 of the seal lip 202. Alternatively, the protrusions may extend up to the distal edge of the seal lip, as far as their heights gradually decrease toward the distal edge of the seal lip. In this arrangement, since undulations for forming the protrusions are less steep at the parting line, burrs are less likely to be formed at the distal edge of the seal lip.

Figure 21:
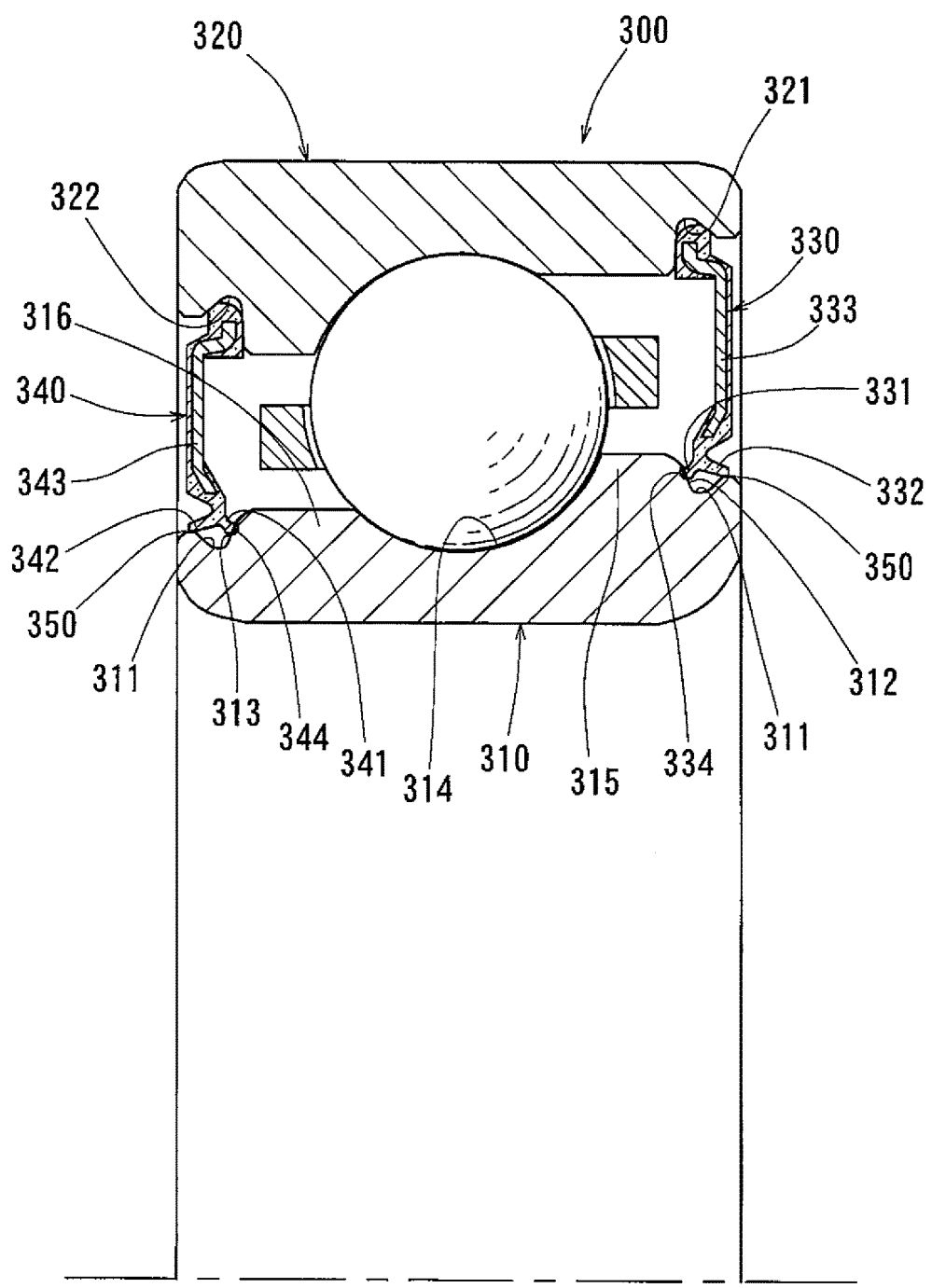
FIG. 21 is a sectional view of a sealed bearing assembly according to a sixth specific embodiment of the present invention.
Figure 22:
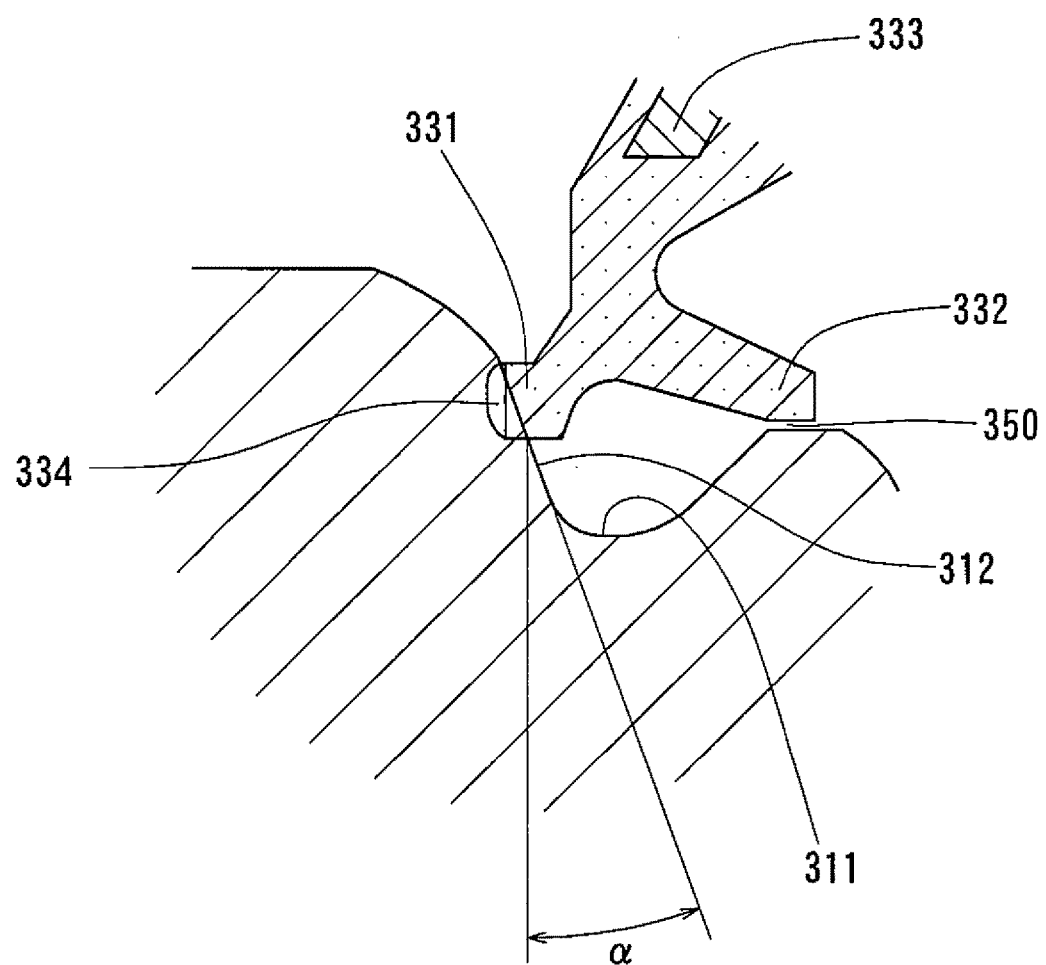
FIG. 22 is an enlarged view of and around a seal lip of a right (in FIG. 21) seal member.

FIGS. 21 and 22 show the sealed bearing assembly 300 of the sixth specific embodiment. The inner race 310 of this sealed bearing assembly 300 is formed with seal grooves 311 extending the entire circumference thereof. The bearing assembly 300 has a bearing interior space defined between the inner race 310 and the outer race 320, and having the respective ends thereof sealed by seal members 330 and 340 retained in respective seal grooves 321 and 322 of the outer race 320.

Each seal member 330, 340 includes a seal lip 331, 341 which is an axial seal lip, and an outer lip 332, 342 located outwardly of the seal lip 331, 341. The seal lip 331, 341 and the outer lip 332, 342 branch from a base portion attached to the metal core 333, 343.

As used herein, an axial seal lip refers to a seal lip fitted, with axial interference, to a seal sliding surface extending parallel, or at an acute angle of less than 45 degrees, to the radial direction, to seal the bearing interior space. A radial seal lip refers to a seal lip fitted, with radial interference, to a seal sliding surface extending parallel, or at an acute angle of 45 degrees or less, to the axial direction, to seal the bearing interior space.

Each seal groove 311 has a side surface as a seal sliding surface 312, 313 which gradually radially expands from the bottom of the seal groove 311 toward the raceway groove 314, and which is configured to slide relative to the seal lip 331, 341 of the corresponding seal member 330, 340. The seal sliding surface is inclined at an acute angle α of less than 45 degrees to the radial direction.

The inner race 310 has a pair of shoulders 315 and 316 on the respective sides of the raceway groove 314, of which the load-bearing shoulder 315 (on the right of FIG. 21), on which axial loads are applied, is higher in height than the other, non-load-bearing shoulder 316 (on the left of FIG. 21). The non-load-bearing shoulder 316 is substantially as high as the shoulders of ordinary deep groove ball bearings. Thus, the sealed bearing assembly 300 has a higher axial load bearing capacity than deep groove ball bearings, while its torque is as low as that of deep groove bearings.

The seal sliding surfaces 312 and 313 are formed on the respective shoulders 315 and 316. Due to a large difference in outer diameter between the load-bearing shoulder 315 and the non-load-bearing shoulder 316, there is a difference in diameter between the seal sliding surface 312 on the load-bearing shoulder 315 and the seal sliding surface 313 on the non-load-bearing shoulder 316. In particular, the seal sliding surface 312, on the right of FIG. 21, is larger in diameter than the seal sliding surface 313, on the left of FIG. 21. This means that during operation of the bearing assembly, the peripheral speed of the right seal sliding surface 312 is higher than that of the left seal sliding surface 313.

Also, during operation of the bearing, due to the difference in diameter between the shoulders 315 and 316, a pumping effect is produced that tends to move lubricating oil in the bearing interior space from left to right in FIG. 21.

The protrusions 334, 344 of each seal lip 331, 341 are formed during vulcanization to extend in the radial direction. In FIGS. 21 and 22, the seal lips 331 and 341 are shown in the unstressed state to illustrate the interference between the protrusions 334, 344 and the seal sliding surface 312, 313. When the protrusions 334, 344 of each seal lip 331, 341 are axially pressed against the seal sliding surface 312, 313, the seal lip 331, 341 is inclined to substantially extend along the seal sliding surface 312, 313, so that the above-mentioned oil passages and wedge-shaped gaps are formed between the protrusions 334, 344 and the seal sliding surface 312, 313 (see FIG. 14).

As shown in FIGS. 21 and 22, a labyrinth gap 350 is defined between the outer lip 332 and the outer wall portion 314 of the seal groove 311. The labyrinth gap 350 makes it difficult for foreign objects having particle diameters larger than 50 μm to enter the seal groove 311 from outside.

The number of the protrusions 334 on the seal member 330, on the right of FIG. 21, differs from the number of the protrusions 344 on the seal member 340, on the left. Also, the protrusions 334 on the right seal member 330 are arranged at different circumferential angular pitches than the protrusions 344 on the left seal member 340. The purpose of these differences is to allow oil films of the same thickness to be formed on both sides of the bearing in spite of the fact that there is a difference in peripheral speed between the right and left seal sliding surfaces 312 and 313, and that the lubricating condition between the right seal member 330 and the seal sliding surface 312 differs from the lubricating condition between the left seal member 340 and the seal sliding surface 313 due to the pumping effect, and further to prevent the formation of oil films so thick as to allow entry of foreign objects having particle diameters larger than 50 μm into the bearing. Thus, with the sealed bearing assembly 300 of the sixth specific embodiment, it is possible to reduce torque due to suitable fluid lubricating condition created between the right (in FIG. 21) seal member 330 and the seal sliding surface 312 and between the left (in FIG. 21) seal member 340 and the seal sliding surface 313, and also to reduce the number of foreign objects that enter the bearing.

With the sealed bearing assembly 300 of the sixth specific embodiment, since the labyrinth gaps 350 make it difficult for foreign objects to reach the seal lips 331 and 341, it is possible to reduce the number of foreign objects that enter the bearing without increasing torque. Generally speaking, compared with a radial seal lip, an axial seal lip tends to move a large distance in the axial direction during operation of the bearing, so that a large gap could form between the axial seal lip and the seal sliding surface when the axial seal lip is separated from the seal sliding surface to the maximum. Therefore, compared with radial seal lips, axial seal lips are not effective in preventing entry of foreign objects into the bearing. In the sixth specific embodiment, the sealing effect of the labyrinth gaps 350 compensates for such disadvantage of the (axial) seal lips 331 and 341, so that the life of the sealed bearing assembly 300 of this embodiment is as long as that of the bearing assembly of any of the first to fifth specific embodiment, in which radial seal lips are used.

Figure 23:
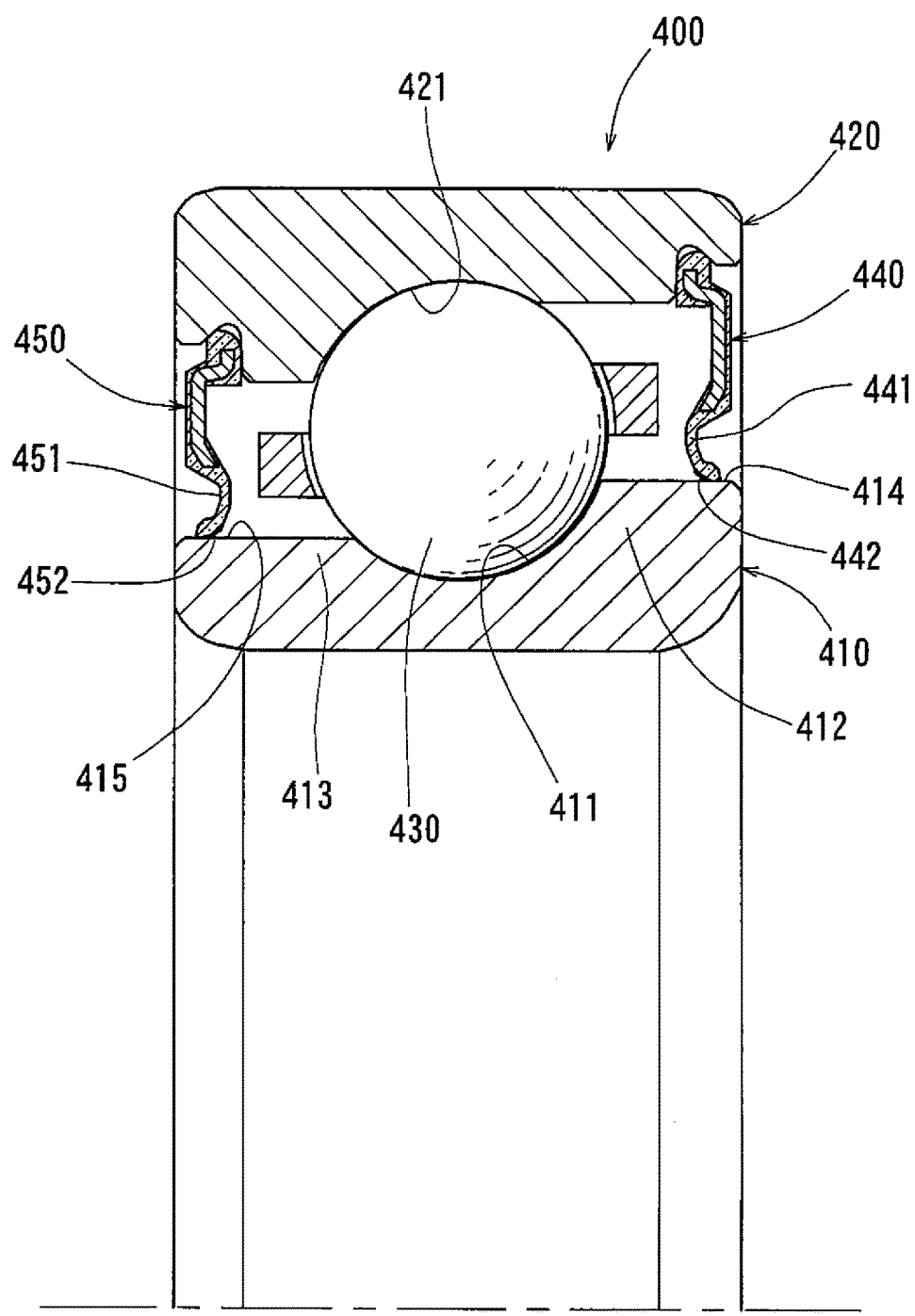
FIG. 23 is a sectional view of a sealed bearing assembly according to a seventh specific embodiment of the present invention.

FIG. 23 shows a sealed bearing assembly 400 of the seventh specific embodiment, which is the same as the sixth specific embodiment in that it is a ball bearing including an inner race 410 having a raceway groove 411, an outer race 420 having a raceway groove 421, a plurality of balls 430 disposed between the raceway grooves 411 and 421, and two seal members 440 and 450 sealing the respective ends of the bearing interior space defined between the inner race 410 and the outer race 420, and that the inner race 410 has a pair of shoulders 412 and 413 on the respective sides of the raceway groove 411, of which the load-bearing shoulder 412, on which axial loads are applied, is higher in height than the other, non-load-bearing shoulder 413. On the other hand, this sealed bearing assembly 400 is the same as the fourth specific embodiment in that the seal members 440 and 450 include seal lips 441 and 451 in the form of radial seal lips.

The inner race 410 has no seal grooves, and has, instead, a cylindrical seal sliding surface 414 defining the radially outer surface of the load-bearing shoulder 412, and a cylindrical seal sliding surface 415 defining the radially outer surface of the non-load-bearing shoulder 413. The difference in diameter between the right (in FIG. 23) seal sliding surface 414 and the left (in FIG. 23) seal sliding surface 415 is substantially equal to the corresponding difference in diameter in the sixth specific embodiment, so that the difference in peripheral speed is also substantially equal to the corresponding difference in peripheral speed in the sixth specific embodiment. As a result, the difference in number, and the difference in circumferential angular pitches, between the protrusions 442 on the right (in FIG. 23) seal member 440 and the protrusions 452 on the left (in FIG. 23) seal member 450 are also substantially the same as the corresponding differences in number and circumferential angular pitches in the sixth specific embodiment. Thus, with the sealed bearing assembly 400 of the seventh specific embodiment too, these differences allow oil films of the same and optimum thickness to be formed between the seal member 440 and the seal sliding surface 414 and between the seal member 450 and the seal sliding surface 415, thereby reducing torque due to fluid lubricating condition, as well as the number of foreign objects that enter the bearing.

Figure 24:
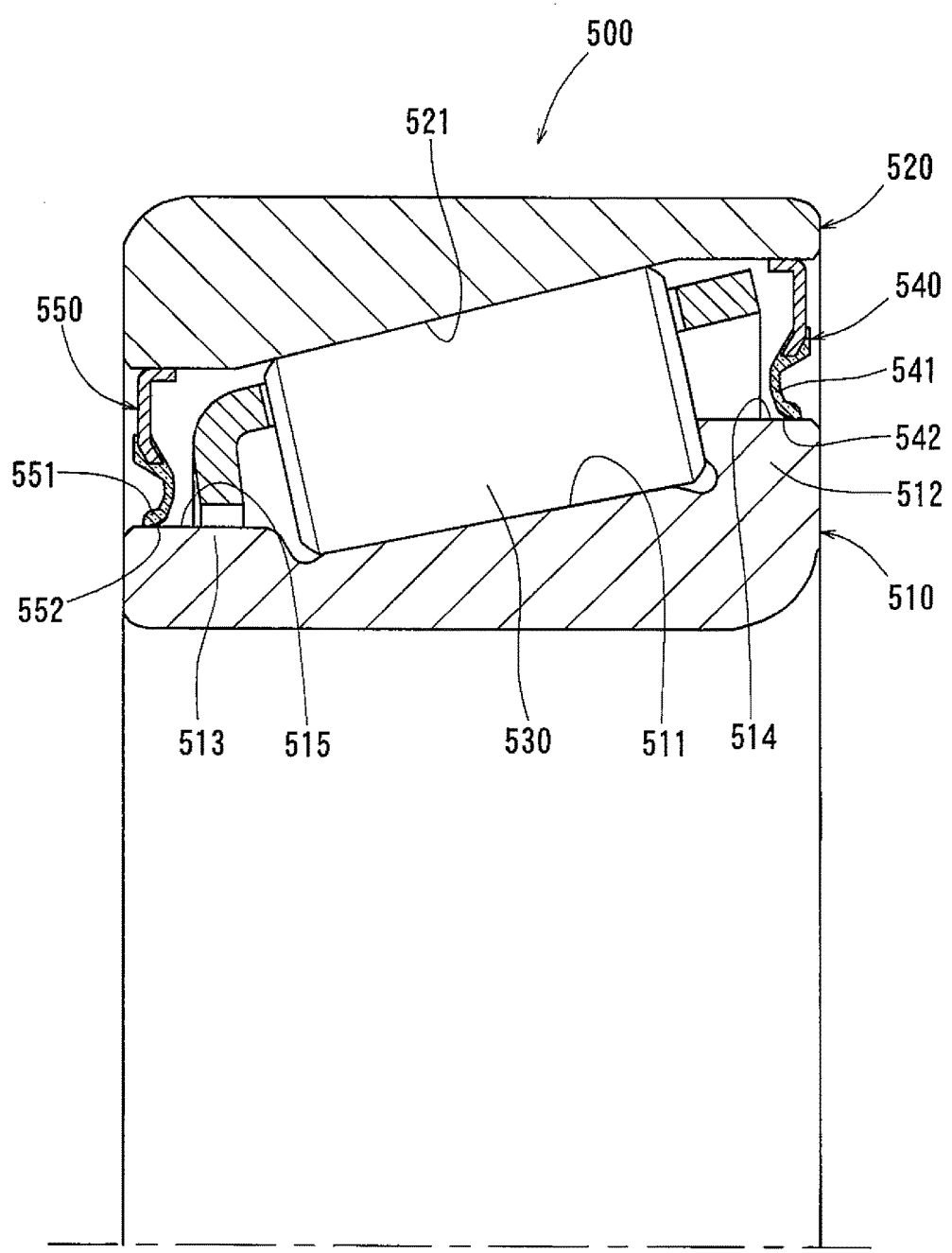
FIG. 24 is a sectional view of a sealed bearing assembly according to an eighth embodiment of the present invention.

FIG. 24 shows a sealed bearing assembly 500 of the eighth embodiment, which is a tapered roller bearing assembly including an inner race 510 having a raceway surface 511, a large flange 512, and a small flange 513; an outer race 520 having a raceway surface 521; a plurality of tapered rollers 530 disposed between the raceway surfaces 511 and 521 of the inner race 510 and the outer race 520; and two seal members 540 and 550 sealing the respective ends of the bearing interior space defined between the inner race 510 and the outer race 520.

During operation of the bearing, the large flange 512 guides the large-diameter end surfaces of the tapered rollers 530, and receives axial loads. The small flange 513 is smaller in outer diameter than the large flange 512, and supports the small-diameter end surfaces of the tapered rollers 530, thereby preventing separation of the tapered rollers 530 from the inner race 510.

The outer race 520 has no seal grooves, and the metal cores of the seal members 540 and 550 are press-fitted in the inner periphery of the outer race 520 at their end portions.

The seal members 540 and 550 include seal lips 541 and 542 in the form of radial seal lips. The inner race 510 has a cylindrical seal sliding surface 514 defining the radially outer surface of the large flange 512, and configured to slide relative to the seal lip 541 of the right (in FIG. 24) seal member 540 in the circumferential direction. The inner race 510 further includes a cylindrical seal sliding surface 515 defining the radially outer surface of the small flange 513, and configured to slide relative to the seal lip 551 of the left (in FIG. 24) seal member 550 in the circumferential direction. Since there is a large difference in diameter between the seal sliding surface 514 on the large flange 512 and the seal sliding surface 515 on the small flange 513, during operation of the bearing, the peripheral speed of the right (in FIG. 24) seal sliding surface 514 is higher than the peripheral speed of the left (in FIG. 24) seal sliding surface 515. Also, during operation of the bearing, due to the above-mentioned difference in diameter, a pumping effect is produced that tends to move lubricating oil in the bearing interior space from left to right in FIG. 24.

The protrusions 542 and 552 on the seal lips 541 and 551 define wedge-shaped gaps and oil passages as shown in FIG. 14, which in turn make it possible to create fluid lubricating condition between the seal lip 541 and the seal sliding surface 514 and between the seal lip 551 and the seal sliding surface 515.

The number of the protrusions 542 on the right (in FIG. 24) seal member 540 differs from the number of the protrusions 542 on the left (in FIG. 24) seal member 550. Also, the protrusions 542 on the right (in FIG. 24) seal member 540 are arranged at different circumferential angular pitches than the protrusions 542 on the left (in FIG. 24) seal member 550. The purpose of these differences is to allow oil films of the same and optimum thickness to be formed on both sides of the bearing in spite of the fact that there is a difference in peripheral speed between the right and left seal sliding surfaces 514 and 515, and that the lubricating condition between the right seal member 540 and the seal sliding surface 514 differs from the lubricating condition between the left seal member 550 and the seal sliding surface 515 due to the pumping effect.

Figure 25:
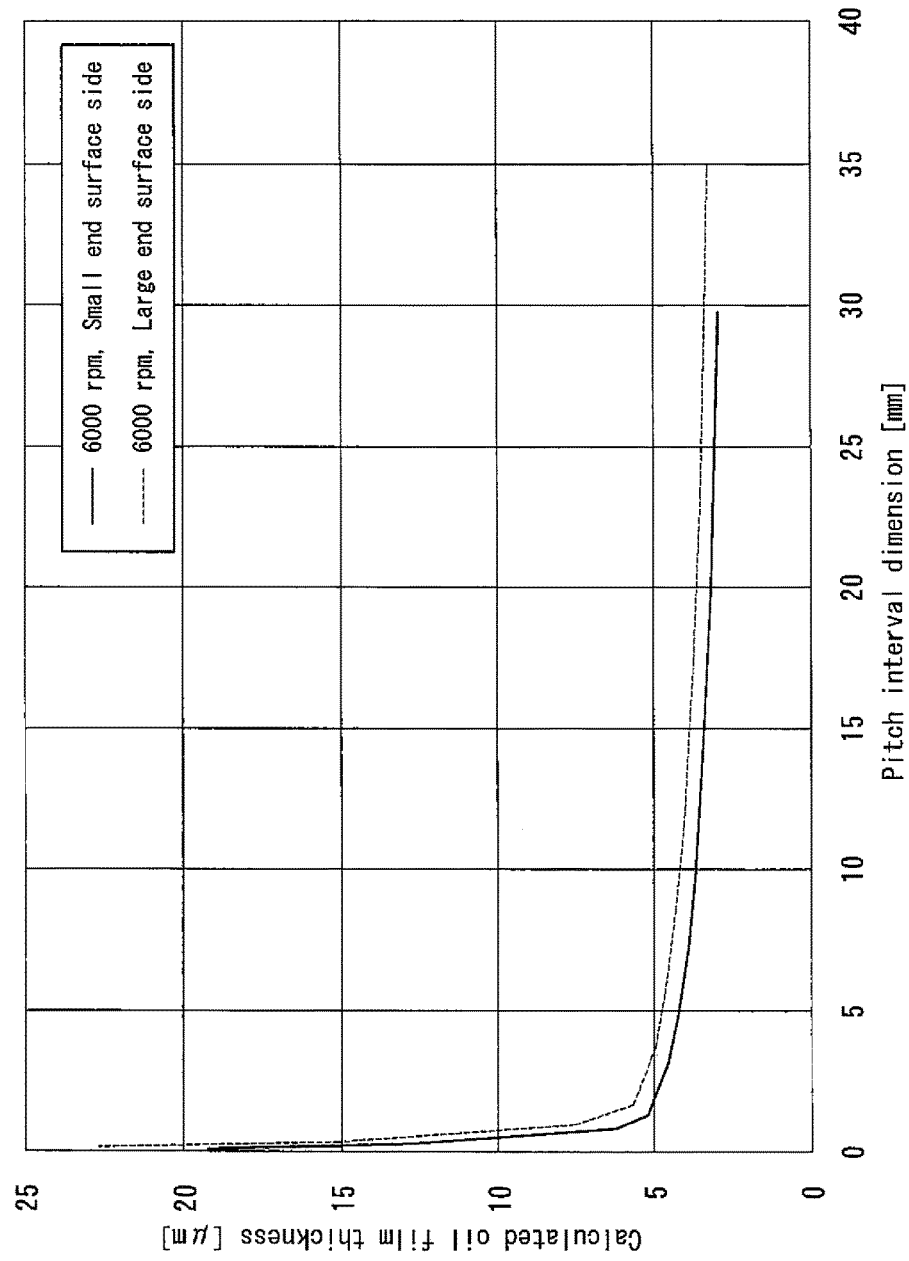
FIG. 25 is a graph showing the relationship between the intervals between protrusions of the eighth embodiment and the theoretical oil film thickness.

FIG. 25 shows the relationship between the intervals d between the protrusions 542 and between the protrusions 552, and the theoretical oil thickness. According to the results of calculation, on the side of the small flange 513 (referred to as the "small end surface side" in FIG. 25), when the intervals d between the protrusions 552 (referred to as "pitch intervals" in FIG. 25) are 6.4 mm, the theoretical oil film thickness is 4.0 µm, while on the side of the large flange 512 (referred to as the "large end surface side" in FIG. 25), when the intervals d between the protrusions 542 (referred to as "pitch intervals" in FIG. 25) are 11.5 mm, the theoretical oil film thickness is 4.0 µm. As is apparent from these calculation results, it is possible to form oil films of the same or substantially same thickness between the seal lip 541 and the seal sliding surface 514 and between the seal lip 551 and the seal sliding surface 515 by determining the numbers and the circumferential angular pitches of the protrusions on the respective sides of the bearing, which determine the intervals d between the protrusions, such that these numbers and the circumferential angular pitches differ from each other.

If, due to too thick oil film being formed, the gap between the seal lip 541 and the seal sliding surface 514 or between the seal lip 551 and the seal sliding surface 515 is way larger than 0.05 mm, foreign objects having particle diameters larger than 50 µm tend to enter the bearing. To prevent this problem, on the respective sides of the bearing, the numbers of protrusions and the circumferential angular pitches of the protrusions, which are parameters that determine the intervals d between the protrusions, are determined independently of each other such that oil films having thicknesses equal to each other and optimum in preventing the above problem are formed between the right (in FIG. 24) seal member 540 and the seal sliding surface 514 and between the left (in FIG. 24) seal member 55 and the seal sliding surface 515.

Thus, with the sealed bearing assembly 500 of the eighth specific embodiment too, as with the sixth and seventh specific embodiments, optimum fluid lubricating condition is created between the right (in FIG. 24) seal member 540 and the seal sliding surface 514 and between the left (in FIG. 24) seal member 550 and the seal sliding surface 515, which allows reduced torque, while reducing the amount of foreign objects that enter the bearing.

Since tapered roller bearings are larger in torque than ball bearings, some conventional tapered roller bearings do not include seal members. However, a large amount of lubricant tends to flow into a tapered roller bearing having no seal members due to a pumping effect inherent to its shape, so that the agitating resistance of the lubricant increases. Also, since foreign objects flows into the bearing together with the lubricant, it was sometimes necessary to subject both the inner and outer races of the tapered roller bearing to hardening treatment such as special heat treatment to keep the raceway surfaces free of scratches due to foreign objects. In contrast, the sealed bearing assembly 500 includes the seal members 540 and 550, and thus is free of the above problems of tapered roller bearings having no seal members. Still, its torque is low due to the above-described fluid lubricating condition. By providing the seal members 540 and 550, it is possible to reduce the amount of lubricant flowing into the bearing due to the pumping effect, and thus to reduce the agitating resistance of lubricant. This reduces the torque of the tapered roller bearing. Also, since the seal members 540 and 550 prevent foreign objects from entering the bearing together with the lubricant, no special treatment of the inner and outer races 510 and 520 is necessary. This reduces the cost of the bearing assembly.

Figure 26:
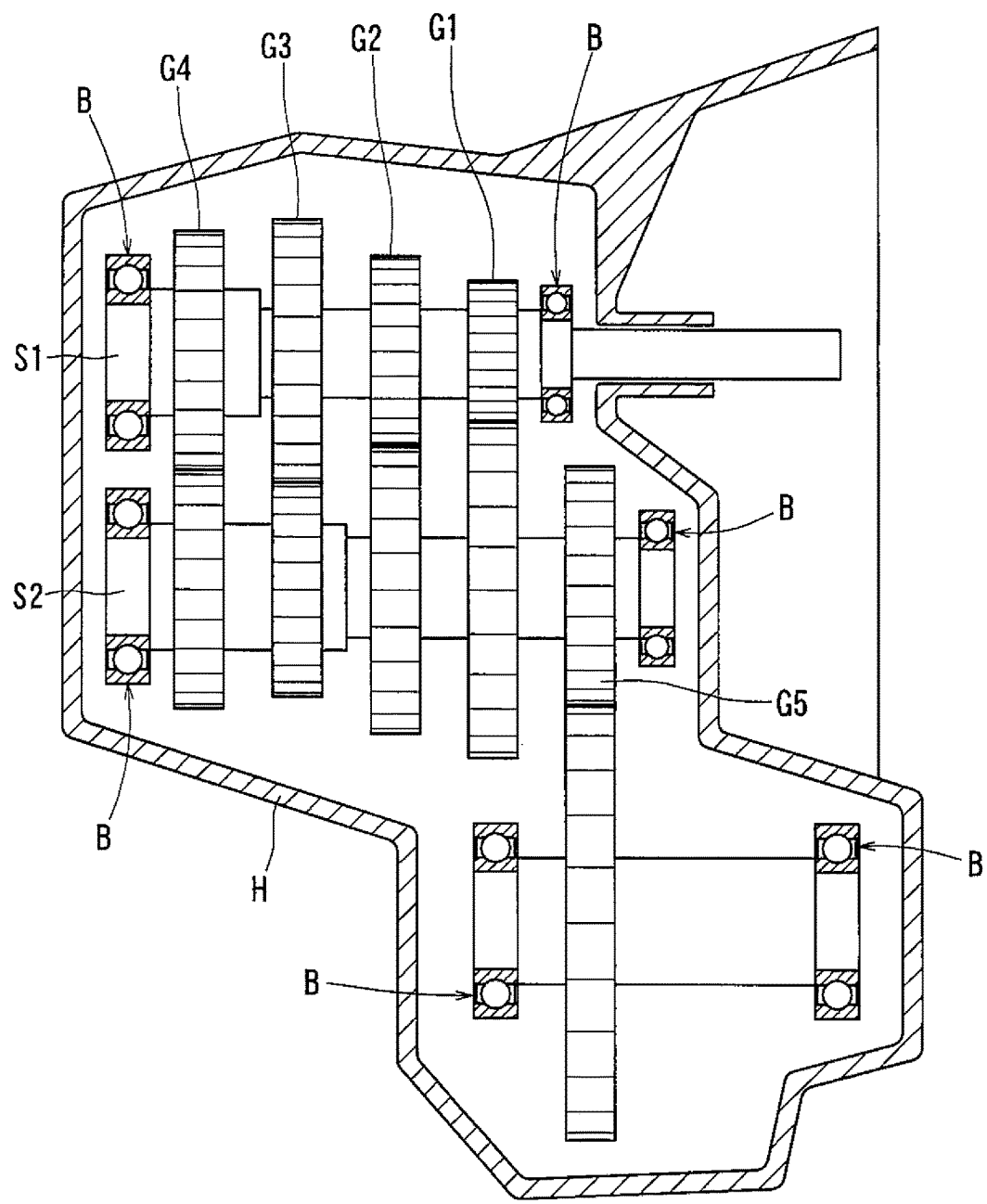
FIG. 26 is a sectional view of a transmission including sealed bearing assemblies according to the present invention.

FIG. 26 shows sealed (rolling) bearing assemblies according to the present invention which are used to support rotary portions of a vehicle transmission. The transmission shown is a multi-speed transmission, i.e., a transmission having multiple speed ratios. Its rotary portions (such as an input shaft S1 and an output shaft S2) are rotatably supported by sealed bearing assemblies B comprising sealed bearing assemblies of any of the above-described embodiments. The transmission shown includes the input shaft S1, to which the rotation of the engine of the vehicle is transmitted, the output shaft S2, which extends parallel to the input shaft S1, a plurality of gear trains G1-G4 through which the rotation of the input shaft S1 is transmitted to the output shaft S2, and clutches, not shown, mounted between the respective gear trains G1-G4 and the input shaft S1 or the output shaft S2. By selectively engaging the respective clutches, the rotation of the input shaft S1 is transmitted to the output shaft S2 through the respective gear trains G1-G4 in different reduction ratios. The rotation of the output shaft S2 transmits to an output gear G5, and then e.g., to a differential. The input shaft S1 and the output shaft S2 are, as mentioned above, rotatably supported by sealed bearing assemblies B. The sealed bearing assemblies B are arranged in the transmission such that their sides are splashed with lubricating oil splashed due to rotation of the gears or injected from nozzles (not shown) in the housing H.

The embodiments illustrated above are mere examples and not intended to restrict the invention. It is to be understood that present invention encompasses not only what is disclosed in the specification, but every other modification and alteration that are considered to be within the scope of the appended claims, and considered to be equivalents of the embodiments.

DESCRIPTION OF THE REFERENCE SIGNS

1. Rolling bearing
2, 150, 330, 340, 440, 450, 540, 550. Seal member
3, 110, 310, 410, 510. Inner race
4, 120, 320, 420, 520. Outer race
5. Rolling element
6. Bearing interior space
7. Rotary shaft
8, 311, 321, 322. Seal groove
9, 151, 202, 331, 341, 441, 451, 541, 551. Seal lip
10, 112, 312, 313, 414, 415, 514, 515. Seal sliding surface
11, 155, 206, 333, 343. Metal core
12. Radially inner portion
13. Vulcanized rubber material
14, 152, 201, 334, 344, 442, 452, 542, 552. Protrusion
15, 160. Oil passage
16, 154, 204. Surface
21. Groove
31, 32. Minute recess
100, 300, 400, 500, B. Sealed bearing assembly
111, 121, 314, 411, 421. Raceway groove
140, 430. Ball
153, 203. Distal edge
205. Surface
315, 316, 412, 413. Shoulder
332, 342. Outer lip
350. Labyrinth gap
511, 521. Raceway surface
512. Large flange
513. Small flange
530. Tapered roller
S1. Input shaft (rotary portion)
S2. Output shaft (Rotary portion)

What is claimed is:

1. A sealed bearing assembly comprising:
a bearing defining a bearing interior space;
a seal member separating the bearing interior space from an exterior of the bearing, and including a seal lip;
a seal sliding surface configured to slide relative to the seal lip in a circumferential direction; and
a protrusion on one circumferential portion of the seal lip, the protrusion at least partially defining an oil passage extending between the seal sliding surface and the seal lip, and communicating with the bearing interior space and the exterior of the bearing;
wherein the protrusion is shaped and positioned such that a fluid lubricating condition can be created between the seal lip and the seal sliding surface, and
wherein the protrusion extends in a direction perpendicular to the circumferential direction, and has a rounded shape such that a distance between the protrusion and the seal sliding surface decreases from respective ends of the protrusion toward a center of the protrusion, with respect to a circumferential width of the protrusion.

2. The sealed bearing assembly of claim 1, wherein the protrusion is one of a plurality of protrusions arranged at equal intervals over an entire circumference, and the oil passage is one of a plurality of oil passages defined by the plurality of protrusions.

3. The sealed bearing assembly of claim 2, wherein the seal member includes a metal core, and a vulcanized rubber material attached to at least a radially inner portion of the metal core, and wherein the seal lip is formed of the vulcanized rubber material.

4. The sealed bearing assembly of claim 2, wherein wedge-shaped gaps are defined between each of the plurality of protrusions and the seal sliding surface such that each of the wedge-shaped gaps is larger on a side of a corresponding one of the oil passages and smaller on a side of the corresponding one of the protrusions.

5. The sealed bearing assembly of claim 4, wherein the seal member includes a metal core, and a vulcanized rubber material attached to at least a radially inner portion of the metal core, and wherein the seal lip is formed of the vulcanized rubber material.

6. The sealed bearing assembly of claim 1, wherein the protrusion is formed with at least one circumferentially extending groove.

7. The sealed bearing assembly of claim 6, wherein the seal member includes a metal core, and a vulcanized rubber material attached to at least a radially inner portion of the metal core, wherein the seal lip is formed of the vulcanized rubber material.

8. The sealed bearing assembly of claim 1, wherein a wedge-shaped gap is defined between the protrusion and the seal sliding surface such that the wedge-shaped gap is larger on a side of the oil passage than on a side of the protrusion.

9. The sealed bearing assembly of claim 8, wherein the seal member includes a metal core, and a vulcanized rubber material attached to at least a radially inner portion of the metal core, and wherein the seal lip is formed of the vulcanized rubber material.

10. The sealed bearing assembly of claim 1, wherein the seal member includes a metal core, and a vulcanized rubber material attached to at least a radially inner portion of the metal core, and wherein the seal lip is formed of the vulcanized rubber material.

11. The sealed bearing assembly of claim 1, wherein the seal lip comprises a radial seal lip.

12. The sealed bearing assembly of claim 11, wherein the seal member includes a metal core, and a vulcanized rubber material attached to at least a radially inner portion of the metal core, and wherein the seal lip is formed of the vulcanized rubber material.

13. The sealed bearing assembly of claim 1, wherein at least one of the seal sliding surface and the protrusion has undulations formed by shot peening.

14. The sealed bearing assembly of claim 13, wherein the seal member includes a metal core, and a vulcanized rubber material attached to at least a radially inner portion of the metal core, and wherein the seal lip is formed of the vulcanized rubber material.

15. The sealed bearing assembly of claim 1, wherein the sealed bearing assembly supports a rotary portion of one of a transmission, a differential, a constant-velocity joint, a propeller shaft, and a turbocharger, of a vehicle, a machine tool, a wind generator, and a wheel bearing.

16. The sealed bearing assembly of claim 15, wherein the seal member includes a metal core, and a vulcanized rubber material attached to at least a radially inner portion of the metal core, and wherein the seal lip is formed of the vulcanized rubber material.

17. The sealed bearing assembly of claim 1, wherein:
the bearing includes an inner race and an outer race, and
the seal sliding surface is on an outer periphery of the inner race.

\* \* \* \* \*